US011458362B1

(12) United States Patent
Berme et al.

(10) Patent No.: US 11,458,362 B1
(45) Date of Patent: Oct. 4, 2022

(54) SWING ANALYSIS SYSTEM

(71) Applicant: Bertec Corporation, Columbus, OH (US)

(72) Inventors: Necip Berme, Worthington, OH (US); Cameron Scott Hobson, Powell, OH (US); Cal Thomas Haefke, Columbus, OH (US)

(73) Assignee: Bertec Corporation, Columbus, OH (US)

( * ) Notice: Subject to any disclaimer, the term of this patent is extended or adjusted under 35 U.S.C. 154(b) by 0 days.

(21) Appl. No.: 17/409,701

(22) Filed: Aug. 23, 2021

Related U.S. Application Data

(63) Continuation-in-part of application No. 17/067,745, filed on Oct. 11, 2020, now Pat. No. 11,097,154.

(60) Provisional application No. 62/913,995, filed on Oct. 11, 2019.

(51) Int. Cl.
*A63B 24/00* (2006.01)
*A63B 102/18* (2015.01)
*A63B 71/06* (2006.01)
*A63B 102/32* (2015.01)

(52) U.S. Cl.
CPC ...... *A63B 24/0003* (2013.01); *A63B 24/0062* (2013.01); *A63B 71/0622* (2013.01); *A63B 2102/18* (2015.10); *A63B 2102/32* (2015.10); *A63B 2220/05* (2013.01); *A63B 2220/16* (2013.01); *A63B 2220/51* (2013.01); *A63B 2220/806* (2013.01)

(58) Field of Classification Search
CPC .......... A61B 5/00; A61B 5/103; G01N 33/50; A63B 24/0003
See application file for complete search history.

(56) References Cited

U.S. PATENT DOCUMENTS

| 6,038,488 A | 3/2000 | Barnes et al. |
| 6,113,237 A | 9/2000 | Ober et al. |
| 6,152,564 A | 11/2000 | Ober et al. |

(Continued)

OTHER PUBLICATIONS

First office action on the merits (Non-Final Rejection) in U.S. Appl. No. 17/067,745, dated Feb. 5, 2021.

(Continued)

*Primary Examiner* — Eugene L Kim
*Assistant Examiner* — Christopher Glenn
(74) *Attorney, Agent, or Firm* — The Law Office of Patrick F. O'Reilly III, LLC

(57) ABSTRACT

A swing analysis system is disclosed herein. The swing analysis system includes a motion capture system and a force measurement assembly configured to receive a user; and at least one data processing device operatively coupled to the motion capture system and the force measurement assembly, the at least one data processing device configured to determine positional information for the one or more body segments of the user from the output data of the at least one motion capture device and output forces and/or moments from the force measurement assembly, the at least one data processing device further configured to determine one or more swing performance parameters for the user using at least one of: (i) the positional information of the one or more body segments of the user from the at least one motion capture device, and (ii) the output forces and/or moments from the force measurement assembly.

18 Claims, 28 Drawing Sheets

(56) References Cited

U.S. PATENT DOCUMENTS

| | | |
|---|---|---|
| 6,295,878 B1 | 10/2001 | Berme |
| 6,354,155 B1 | 3/2002 | Berme |
| 6,389,883 B1 | 5/2002 | Berme et al. |
| 6,936,016 B2 | 8/2005 | Berme et al. |
| 8,181,541 B2 | 5/2012 | Berme |
| 8,246,354 B2 * | 8/2012 | Chu .................. A63B 22/0292 |
| | | 434/258 |
| 8,315,822 B2 | 11/2012 | Berme et al. |
| 8,315,823 B2 | 11/2012 | Berme et al. |
| D689,388 S | 9/2013 | Berme |
| D689,389 S | 9/2013 | Berme |
| 8,543,540 B1 | 9/2013 | Wilson et al. |
| 8,544,347 B1 | 10/2013 | Berme |
| 8,643,669 B1 | 2/2014 | Wilson et al. |
| 8,700,569 B1 | 4/2014 | Wilson et al. |
| 8,704,855 B1 | 4/2014 | Berme et al. |
| 8,764,532 B1 | 7/2014 | Berme |
| 8,847,989 B1 | 9/2014 | Berme et al. |
| D715,669 S | 10/2014 | Berme |
| 8,902,249 B1 | 12/2014 | Wilson et al. |
| 8,915,149 B1 | 12/2014 | Berme |
| 9,032,817 B2 | 5/2015 | Berme et al. |
| 9,043,278 B1 | 5/2015 | Wilson et al. |
| 9,066,667 B1 | 6/2015 | Berme et al. |
| 9,081,436 B1 | 7/2015 | Berme et al. |
| 9,168,420 B1 | 10/2015 | Berme et al. |
| 9,173,596 B1 | 11/2015 | Berme et al. |
| 9,200,897 B1 | 12/2015 | Wilson et al. |
| 9,277,857 B1 | 3/2016 | Berme et al. |
| D755,067 S | 5/2016 | Berme et al. |
| 9,404,823 B1 | 8/2016 | Berme et al. |
| 9,414,784 B1 | 8/2016 | Berme et al. |
| 9,468,370 B1 | 10/2016 | Shearer |
| 9,517,008 B1 | 12/2016 | Berme et al. |
| 9,526,443 B1 | 12/2016 | Berme et al. |
| 9,526,451 B1 * | 12/2016 | Berme .................. A63B 23/04 |
| 9,558,399 B1 | 1/2017 | Jeka et al. |
| 9,568,382 B1 | 2/2017 | Berme et al. |
| 9,622,686 B1 | 4/2017 | Berme et al. |
| 9,763,604 B1 | 9/2017 | Berme et al. |
| 9,770,203 B1 | 9/2017 | Berme et al. |
| 9,778,119 B2 | 10/2017 | Berme et al. |
| 9,814,430 B1 | 11/2017 | Berme et al. |
| 9,829,311 B1 * | 11/2017 | Wilson .................. A61B 5/7435 |
| 9,854,997 B1 | 1/2018 | Berme et al. |
| 9,916,011 B1 | 3/2018 | Berme et al. |
| 9,927,312 B1 | 3/2018 | Berme et al. |
| 10,010,248 B1 | 7/2018 | Shearer |
| 10,010,286 B1 | 7/2018 | Berme et al. |
| 10,085,676 B1 | 10/2018 | Berme et al. |
| 10,117,602 B1 | 11/2018 | Berme et al. |
| 10,126,186 B2 | 11/2018 | Berme et al. |
| 10,216,262 B1 | 2/2019 | Berme et al. |
| 10,231,662 B1 | 3/2019 | Berme et al. |
| 10,264,964 B1 | 4/2019 | Berme et al. |
| 10,331,324 B1 | 6/2019 | Wilson et al. |
| 10,342,473 B1 | 7/2019 | Berme et al. |
| 10,390,736 B1 | 8/2019 | Berme et al. |
| 10,413,230 B1 | 9/2019 | Berme et al. |
| 10,463,250 B1 | 11/2019 | Berme et al. |
| 10,527,508 B2 | 1/2020 | Berme et al. |
| 10,555,688 B1 | 2/2020 | Berme et al. |
| 10,646,153 B1 | 5/2020 | Berme et al. |
| 10,722,114 B1 | 7/2020 | Berme et al. |
| 10,736,545 B1 | 8/2020 | Berme et al. |
| 10,765,936 B2 | 9/2020 | Berme et al. |
| 10,803,990 B1 | 10/2020 | Wilson et al. |
| 10,853,970 B1 | 12/2020 | Akbas et al. |
| 10,856,796 B1 | 12/2020 | Berme et al. |
| 10,860,843 B1 | 12/2020 | Berme et al. |
| 10,945,599 B1 | 3/2021 | Berme et al. |
| 10,966,606 B1 | 4/2021 | Berme |
| 11,033,453 B1 | 6/2021 | Berme et al. |
| 11,052,288 B1 | 7/2021 | Berme et al. |
| 11,054,325 B2 | 7/2021 | Berme et al. |
| 11,074,711 B1 | 7/2021 | Akbas et al. |
| 11,097,154 B1 | 8/2021 | Berme et al. |
| 2003/0216656 A1 | 11/2003 | Berme et al. |
| 2004/0172213 A1 * | 9/2004 | Kainulainen ...... A63B 69/3608 |
| | | 702/141 |
| 2008/0221487 A1 * | 9/2008 | Zohar .................. A61B 5/1127 |
| | | 600/595 |
| 2008/0228110 A1 | 9/2008 | Berme |
| 2009/0029793 A1 | 1/2009 | Cage |
| 2010/0210974 A1 * | 8/2010 | Brett .................... A61B 5/1038 |
| | | 600/595 |
| 2011/0184225 A1 | 7/2011 | Whitall et al. |
| 2011/0277562 A1 | 11/2011 | Berme |
| 2012/0183940 A1 * | 7/2012 | Aragones ............... A61B 5/744 |
| | | 434/247 |
| 2012/0240691 A1 * | 9/2012 | Wettels ..................... G01L 1/25 |
| | | 73/862.624 |
| 2012/0266648 A1 | 10/2012 | Berme et al. |
| 2012/0271565 A1 | 10/2012 | Berme et al. |
| 2014/0342844 A1 * | 11/2014 | Mooney ................. A63B 69/36 |
| | | 473/266 |
| 2015/0096387 A1 | 4/2015 | Berme et al. |
| 2016/0084869 A1 * | 3/2016 | Yuen .................... A63B 21/072 |
| | | 73/510 |
| 2016/0245711 A1 | 8/2016 | Berme et al. |
| 2016/0334288 A1 | 11/2016 | Berme et al. |
| 2018/0024015 A1 | 1/2018 | Berme et al. |
| 2018/0200605 A1 * | 7/2018 | Syed ........................ G06N 3/08 |
| 2018/0361223 A1 * | 12/2018 | Cherryhomes .... G09B 19/0038 |
| 2019/0078951 A1 | 3/2019 | Berme et al. |
| 2019/0282131 A1 * | 9/2019 | Chang ..................... A61H 1/02 |
| 2020/0139229 A1 | 5/2020 | Berme et al. |
| 2020/0408625 A1 | 12/2020 | Berme et al. |

OTHER PUBLICATIONS

Notice of Allowance in U.S. Appl. No. 17/067,745, dated Apr. 19, 2021.

* cited by examiner

SWING ANALYSIS SYSTEM

CROSS-REFERENCE TO RELATED APPLICATIONS

This is a continuation-in-part of U.S. Nonprovisional patent application Ser. No. 17/067,745 entitled "Swing Analysis System", filed on Oct. 11, 2020; which claims the benefit of U.S. Provisional Patent Application No. 62/913,995, entitled "Swing Analysis System", filed on Oct. 11, 2019, the disclosure of each of which is hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a swing analysis system for improving athletic performance. More particularly, the invention relates to a swing analysis system for improving the athletic performance of an athlete that engages in a swinging motion during the execution of the sport, such as the swinging of a baseball bat or a golf club.

2. Background

Training for a sporting activity usually requires going through the same motion repeatedly. Typically, a coach or trainer first tells the athlete what to do, and then observes the motion and corrects mistakes. Particularly, in movements performed quickly, the coach or trainer explains the mistakes after the trainee performs the activity. This may take the form of showing a video of the trainee performing the activity, and then pointing out the errors. Seeing the mistakes after the fact is not as effective as getting quantitative feedback while performing the activity. This type of feedback is particularly important for sports that involve the swinging of a particular implement, such as a baseball bat or golf club.

What is needed, therefore, is a swing analysis system that is capable of determining swing performance metrics from output data of a force measurement assembly. Moreover, a swing analysis system is needed that is capable of autodetecting one or more swing phases of a user. Furthermore, a need exists for a swing analysis system that is capable of generating a swing analysis report that includes one or more swing performance metrics.

BRIEF SUMMARY OF EMBODIMENTS OF THE INVENTION

Accordingly, the present invention is directed to a swing analysis system that substantially obviates one or more problems resulting from the limitations and deficiencies of the related art.

In accordance with one or more embodiments of the present invention, there is provided a swing analysis system that comprises a motion capture system comprising at least one motion capture device configured to detect the motion of one or more body segments of a user and generate output data; a force measurement assembly configured to receive the user, the force measurement assembly including a top surface for receiving the body of the user; and at least one force transducer, the at least one force transducer configured to sense one or more measured quantities and output one or more signals that are representative of forces and/or moments being applied to the top surface of the force measurement assembly by the user; and at least one data processing device operatively coupled to the motion capture system and the force measurement assembly, the at least one data processing device configured to determine positional information for the one or more body segments of the user from the output data of the at least one motion capture device, the at least one data processing device further configured to receive the one or more signals that are representative of the forces and/or moments being applied to the top surface of the force measurement assembly by the user, and to convert the one or more signals into output forces and/or moments, and the at least one data processing device additionally configured to determine one or more swing performance parameters for the user using at least one of: (i) the positional information of the one or more body segments of the user from the at least one motion capture device, and (ii) the output forces and/or moments from the force measurement assembly.

In a further embodiment of the present invention, the positional information of the one or more body segments of the user determined by the at least one data processing device comprises keypoints for the one or more body segments of the user generated using a trained neural network.

In yet a further embodiment, the one or more swing performance parameters determined by the at least one data processing device comprise one or more center of mass locations for the one or more body segments of the user determined using the keypoints generated from the trained neural network.

In still a further embodiment, the one or more swing performance parameters determined by the at least one data processing device further comprise an overall body center of mass location for the body of the user determined using the one or more center of mass locations for the one or more body segments of the user.

In yet a further embodiment, the output forces and/or moments determined by the at least one data processing device include first shear force ($F_x$) values, second shear force ($F_y$) values, and vertical force ($F_z$) values; the one or more swing performance parameters determined by the at least one data processing device further comprise a moment about the center of mass for the user; and the at least one data processing device determines the moment about the center of mass for the user as a function of the overall body center of mass location for the user and the first shear force values, the second shear force values, and the vertical force values.

In still a further embodiment, at least one data processing device further determines the moment about the center of mass for the user as a function of a center of pressure for the user on the force measurement assembly.

In yet a further embodiment, the one or more swing performance parameters determined by the at least one data processing device comprise one or more body segment angles for the one or more body segments of the user determined using the keypoints generated from the trained neural network.

In still a further embodiment, the one or more swing performance parameters determined by the at least one data processing device further comprise one or more body joint angles for the user determined using the one or more body segment angles for the one or more body segments of the user.

In yet a further embodiment, the one or more swing performance parameters determined by the at least one data processing device further comprise one or more body joint angular velocities for the user determined using the one or more body joint angles of the user.

In still a further embodiment, the one or more swing performance parameters determined by the at least one data processing device further comprise one or more body joint angular accelerations for the user determined using the one or more body joint angular velocities of the user.

In yet a further embodiment, the one or more swing performance parameters determined by the at least one data processing device further comprise one or more body segment angular velocities for the one or more body segments of the user determined using the one or more body segment angles for the one or more body segments of the user.

In still a further embodiment, the one or more swing performance parameters determined by the at least one data processing device further comprise one or more body segment angular accelerations for the one or more body segments of the user determined using the one or more body segment angular velocities for the one or more body segments of the user.

In yet a further embodiment, the force measurement assembly is in the form of an instrumented treadmill, force plate, or a balance plate.

In still a further embodiment, the force measurement assembly comprises a front force plate and a rear force plate.

In yet a further embodiment, the at least one data processing device is further configured to characterize a swing quality of the user by utilizing the one or more swing performance parameters and a trained neural network.

It is to be understood that the foregoing summary and the following detailed description of the present invention are merely exemplary and explanatory in nature. As such, the foregoing summary and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS
OF THE INVENTION

The present invention is described herein, in an exemplary manner, with reference to computer system architecture and exemplary processes carried out by the computer system. In one or more embodiments, the functionality described herein can be implemented by computer system instructions. These computer program instructions may be loaded directly onto an internal data storage device of a computing device (e.g., an internal data storage device of a laptop computing device). Alternatively, these computer program instructions could be stored on a portable computer-readable medium (e.g., a flash drive, etc.), and then subsequently loaded onto a computing device such that the instructions can be executed thereby. In other embodiments, these computer program instructions could be embodied in the hardware of the computing device, rather than in the software thereof. It is also possible for the computer program instructions to be embodied in a combination of both the hardware and the software.

This description describes in general form the computer program(s) required to carry out the swing analysis for a user. Any competent programmer in the field of information technology could develop a system using the description set forth herein.

For the sake of brevity, conventional computer system components, conventional data networking, and conventional software coding will not be described in detail herein. Also, it is to be understood that the connecting lines shown in the block diagram(s) included herein are intended to represent functional relationships and/or operational couplings between the various components. In addition to that which is explicitly depicted, it is to be understood that many alternative or additional functional relationships and/or physical connections may be incorporated in a practical application of the system.

Figure 2:
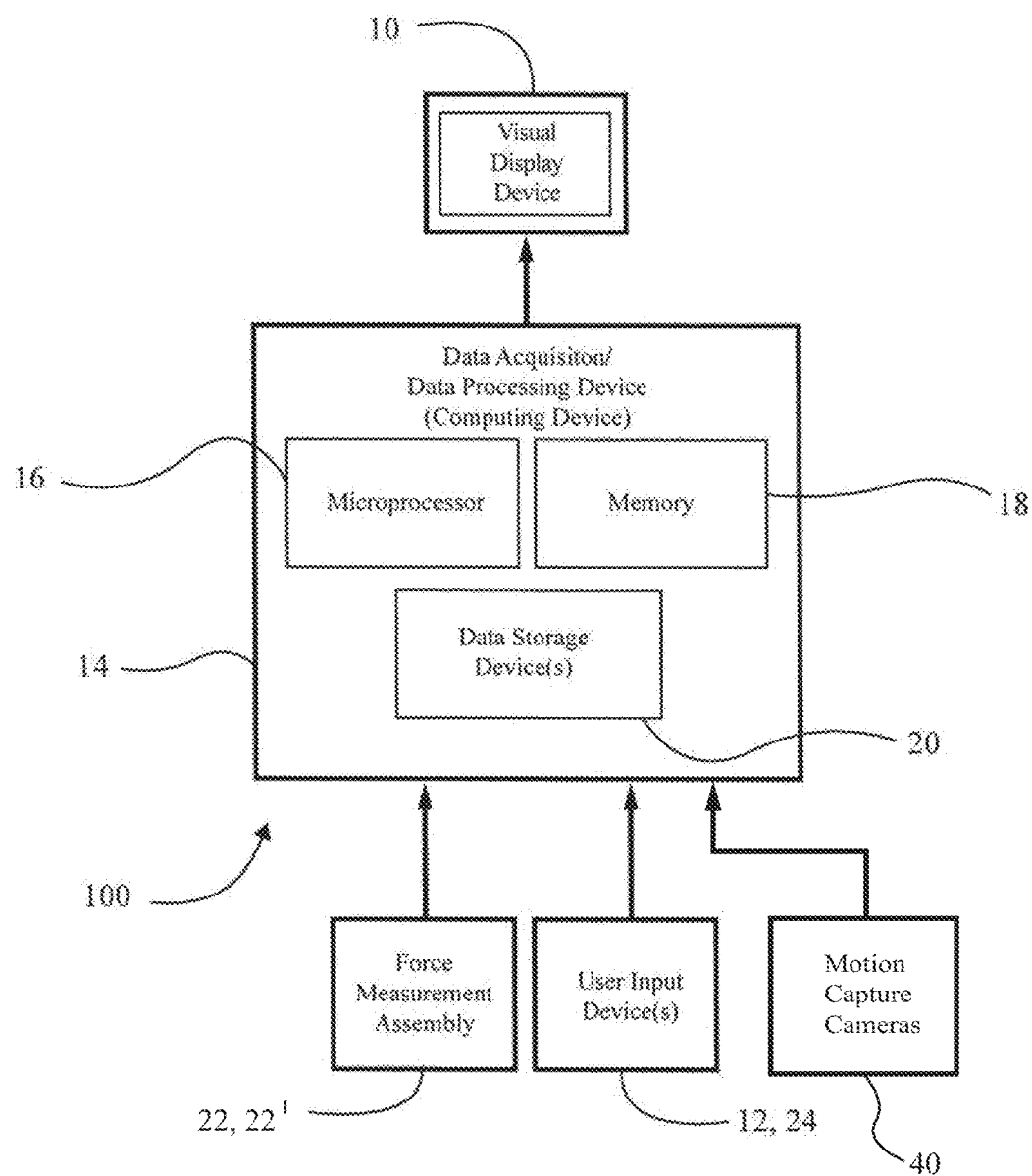
FIG. 2 is a block diagram of constituent components that may be utilized in the illustrative embodiment of the swing analysis system described herein.

An illustrative embodiment of a swing analysis system is seen generally at 100 in FIG. 2. In the illustrative embodiment, the swing analysis system 100 generally comprises a visual display device 10 and a data processing device and/or data processing and data acquisition device 14 (e.g., a computing device or a computer). In one or more embodiments, the graphs depicted in FIGS. 3-22 and described hereinafter are displayed on the output screen of the visual display device 10 so that the graphical force output data of a baseball swing is visible to a user.

As shown in the illustrative block diagram of FIG. 2, the swing analysis system 100 further includes one or more user input devices 12, 24. The user input device 12, 24 is configured to output a signal based upon an input response by a user. In the illustrative embodiment, the user input devices 12, 24 may comprise (i) a voice recognition device, (ii) a wireless remote control with one or more buttons, (iii) a mouse, (iv) a keyboard (i.e., a virtual or physical keyboard), (v) a clicking device, (vi) a joystick, (vii) a pointing device, and/or (viii) a touchscreen user interface of the visual display device 10.

Now, turning again to FIG. 2, it can be seen that the data processing device 14 (e.g., the computing device 14) of the swing analysis system 100 comprises a microprocessor 16 for processing data, memory 18 (e.g., random access memory or RAM) for storing data during the processing thereof, and data storage device(s) 20, such as one or more internal solid state drives, external flash drives, or any combination thereof. As shown in FIG. 2, the visual display device 10 is operatively coupled to the computing device 14 such that data is capable of being transferred between these devices (e.g., the visual display device 10 may be a touchscreen visual display device with a touchscreen user interface as described above). Also, as illustrated in FIG. 2, one or more data input devices 12, 24, such as the touchscreen user interface or a voice recognition sensor are operatively coupled to the computing device 14 so that a user is able to enter data into the computing device 14. In one or more alternative embodiments, the computing device 14 may be in the form of a laptop computing device or a desktop computer. Also, in one or more alternative embodiments, the visual display device 10 may be in the form of a head-mounted visual display device (e.g., a display incorporated in a pair of goggles), and the user input device 24 may be in the form of a voice recognition device or a touchpad interface.

Referring again to FIG. 2, it can be seen that the illustrative swing analysis system 100 further includes a force measurement assembly 22 for measuring the ground reaction forces and/or moments of the user. In particular, the force measurement assembly 22 may comprise static front and rear force plates 26, 28 (see FIG. 1) that are configured to rest on the floor of the room in which the system 100 is disposed for accommodating a baseball player 30 or golfer. The front and rear force plates 22 comprise a plurality of force transducers or load cells for measuring the forces and/or moments generated on the plate surfaces thereof by respective feet of the user. As such, the center of pressure (COP), center of gravity (COG), and/or sway angle of the user may be determined while the user swings a baseball bat or other sports implement on the force measurement assembly 22.

In the illustrative embodiment, the force measurement assembly 22 is operatively coupled to the data processing device 14 by virtue of an electrical cable. In one embodiment, the electrical cable is used for data transmission, as well as for providing power to the force measurement assembly 22. Various types of data transmission cables can be used for the cable. For example, the cable can be a Universal Serial Bus (USB) cable or an Ethernet cable. Preferably, the electrical cable contains a plurality of electrical wires bundled together, with at least one wire being used for power and at least another wire being used for transmitting data. The bundling of the power and data transmission wires into a single electrical cable advantageously creates a simpler and more efficient design. In addition, it enhances the safety of the training environment for the user. However, it is to be understood that the force measurement assembly 22 can be operatively coupled to the data processing device 14 using other signal transmission means, such as a wireless data transmission system. If a wireless data transmission system is employed, it is preferable to provide the force measurement assembly 22 with a separate power supply in the form of an internal power supply or a dedicated external power supply.

Now, the acquisition and processing of the load data carried out by the illustrative embodiment of the swing analysis system 100 will be described. Initially, a load is applied to the force measurement assembly 22 by the user disposed thereon. The load is transmitted from the front and rear plate components of the force measurement assembly 22 to its force transducer beams. In the illustrative embodiment, each plate component of the force measurement assembly 22 is supported on a plurality of force transducer beams disposed thereunder. In the illustrative invention, each of the force transducer beams includes a plurality of strain gages wired in one or more Wheatstone bridge configurations, wherein the electrical resistance of each strain gage is altered when the associated portion of the associated beam-type force transducer undergoes deformation (i.e., a measured quantity) resulting from the load (i.e., forces and/or moments) acting on the front and rear plate components. For each plurality of strain gages disposed on the force transducer beams, the change in the electrical resistance of the strain gages brings about a consequential change in the output voltage of the Wheatstone bridge (i.e., a quantity representative of the load being applied to the measurement surface). Thus, in the illustrative embodiment, the pair of force transducer beams disposed under the plate components output a plurality of analog output voltages (signals). In the illustrative embodiment, the plurality of output voltages from the front and rear force plates are then transmitted to a preamplifier board (not shown) for preconditioning. The preamplifier board is used to increase the magnitudes of the transducer analog voltages, and preferably, to convert the analog voltage signals into digital voltage signals as well. After which, the force measurement assembly 22 transmits the force plate output signals to a main signal amplifier/converter. Depending on whether the preamplifier board also includes an analog-to-digital (A/D) converter, the force plate output signals could be either in the form of analog signals or digital signals. The main signal amplifier/converter further magnifies the force plate output signals, and if the signals are of the analog-type (for a case where the preamplifier board did not include an analog-to-digital (A/D) converter), it may also convert the analog signals to digital signals. In the illustrative embodiment, the force plate output signals may also be transformed into output forces and/or moments by the firmware of the front and rear force plates by multiplying the voltage signals by a calibration matrix prior to the force plate output data being transmitted to the data processing device 14. Alternatively, the data acquisition/data processing device 14 may receive the voltage signals, and then transform the signals into output forces and/or moments by multiplying the voltage signals by a calibration matrix.

After the voltage signals are transformed into output forces and/or moments, the center of pressure for each foot of the user (i.e., the x and y coordinates of the point of application of the force applied to the measurement surface by each foot) may be determined by the data acquisition/data processing device 14.

In the illustrative embodiment, the data processing device 14 determines all three (3) orthogonal components of the resultant forces acting on the front and rear force plates (i.e., $F_{Fx}$, $F_{Fy}$, $F_{Fz}$, $F_{Rx}$, $F_{Ry}$, $F_{Rz}$) and all three (3) orthogonal components of the moments acting on the front and rear force plates (i.e., $M_{Fx}$, $M_{Fy}$, $M_{Fz}$, $M_{Rx}$, $M_{Ry}$, $M_{Rz}$), while in another embodiment, a subset of these force and moment components may be determined.

In the illustrative embodiment, where a single set of overall center of pressure coordinates ($x_P$, $y_P$) are determined for the force measurement assembly 22, the center of pressure of the force vector $\vec{F}$ applied by the user to the measurement surface of the force plate 22 is computed as follows:

$$x_P = \frac{-M_y}{F_Z} \quad (1)$$

$$y_P = \frac{M_x}{F_Z} \quad (2)$$

where:

$x_P$, $y_P$: coordinates of the point of application for the force (i.e., center of pressure) on the force plate assembly 22;

$F_Z$: z-component of the resultant force acting on the force plate assembly 22;

$M_x$: x-component of the resultant moment acting on the force plate assembly 22; and $M_y$: y-component of the resultant moment acting on the force plate assembly 22.

In an alternative embodiment, the center of pressure coordinates ($x_P$, $y_P$) may be determined separately for the front and rear force plates of the force measurement assembly 22.

Figure 3:
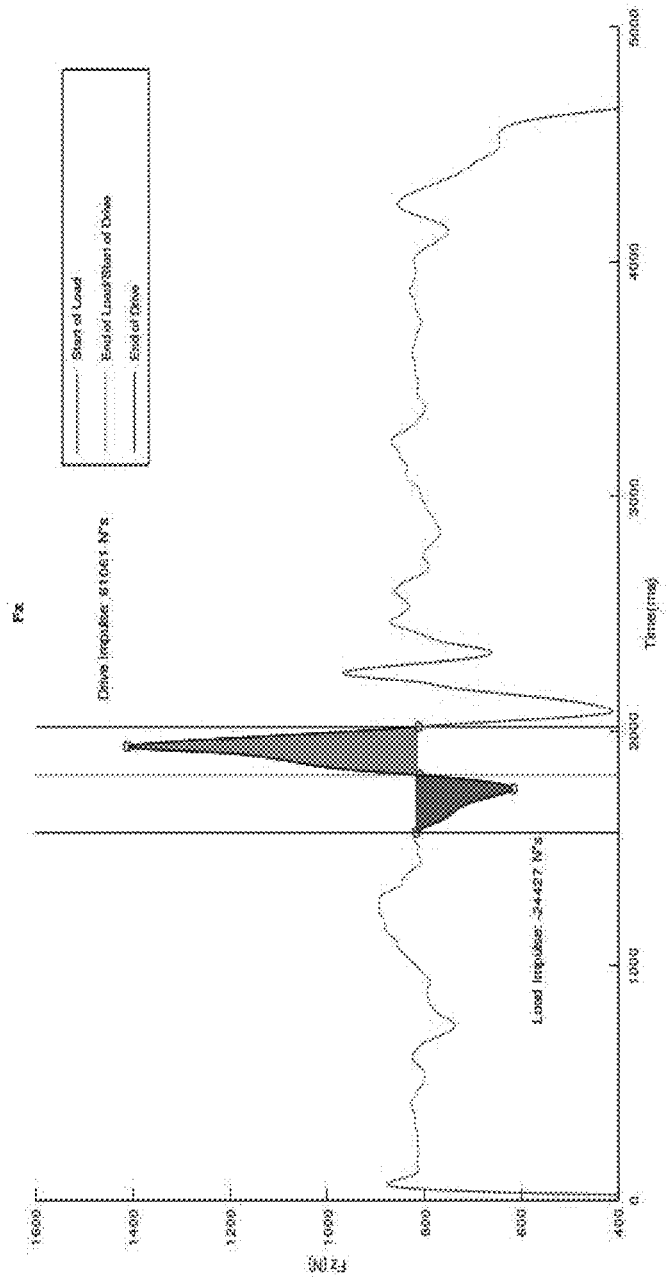
FIG. 3 is a graph illustrating a vertical force curve generated during a baseball swing where the load phase and the drive phase of the baseball swing are depicted, according to an embodiment of the invention.

In the illustrative embodiment, the data processing device 14 of the swing analysis system 100 is programmed to determine a plurality of different outputs from the force plate output data, which may include: (i) autodetection of movements (e.g., during golf, vertical jump, baseball swing phases), (ii) peak forces ($F_x$, $F_y$, and $F_z$) and torques, (iii) impulses, (iv) timing metrics, (v) timestamps of important events, and (vi) rate of force development. For example, as illustrated in the graph of FIG. 3, the data processing device 14 may be programmed to determine z-axis metrics during the load phase (i.e., the shaded minimum region in FIG. 3) and the drive phase (i.e., the shaded maximum region in FIG. 3), such as the peak $F_z$ load force and the peak $F_z$ drive force. The load phase is the countermovement while loading before swinging, while the drive phase is the maximum vertical force created before contact with the ball. Turning again to FIG. 3, the peak $F_z$ load force is the lowest point in the shaded minimum region of FIG. 3, while the peak $F_z$ drive force is the highest point in the shaded maximum region of FIG. 3.

Figure 4:
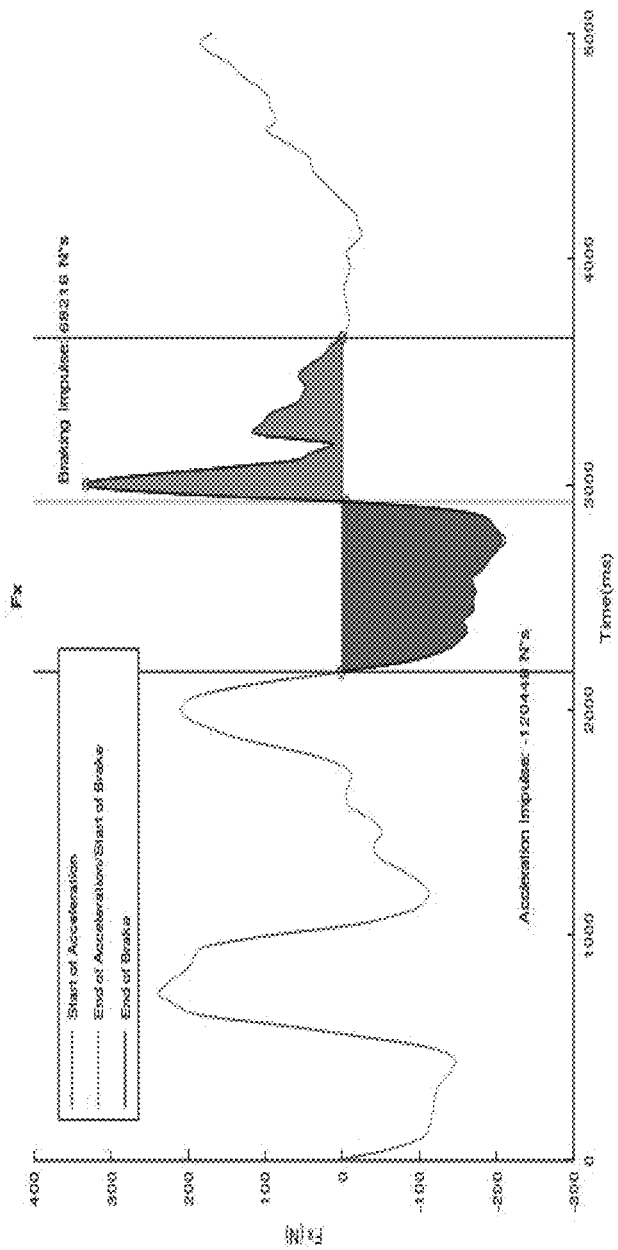
FIG. 4 is a graph illustrating an x-axis force curve generated during a baseball swing where the acceleration phase and the braking phase of the baseball swing are depicted, according to an embodiment of the invention.
Figure 5:
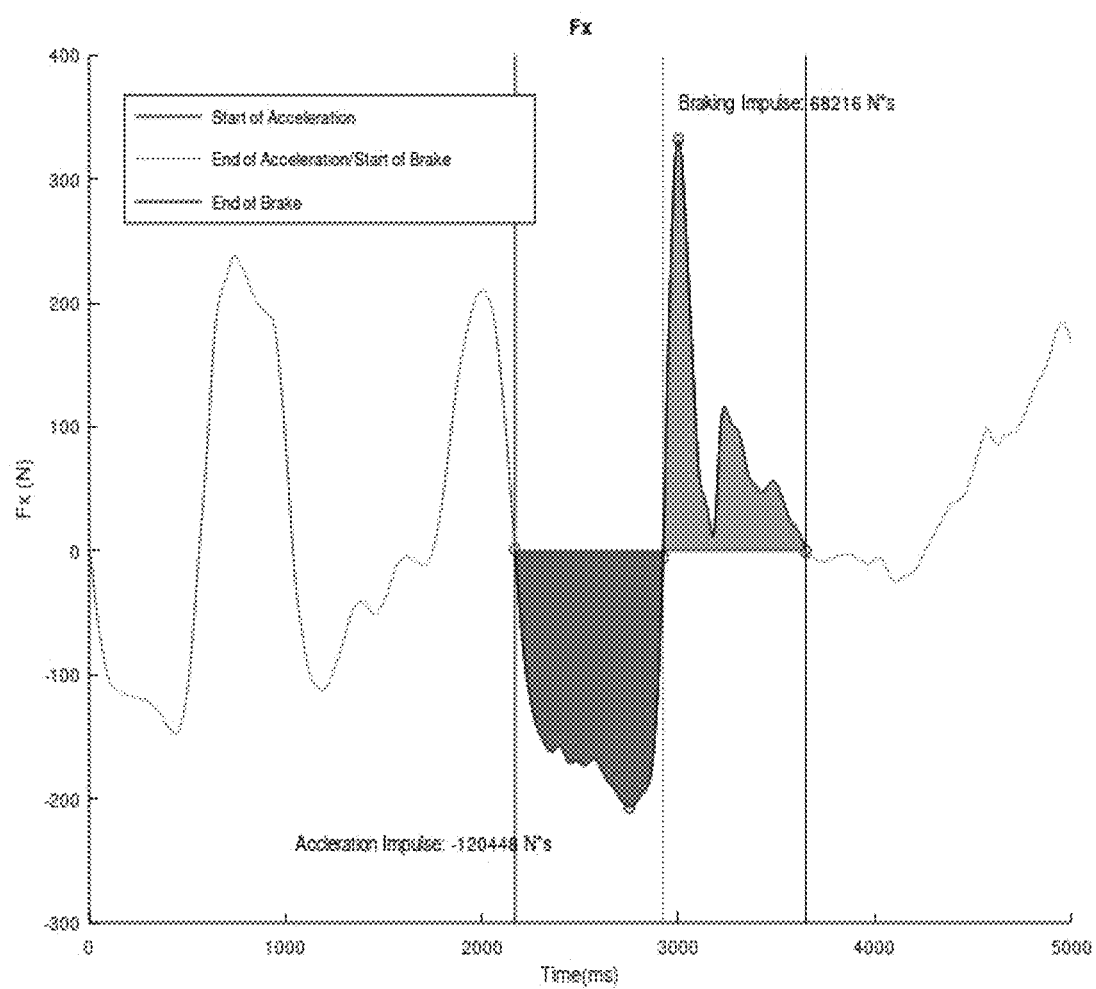
FIG. 5 is another graph illustrating an x-axis force curve generated during a baseball swing where the acceleration phase and the braking phase of the baseball swing are depicted, according to an embodiment of the invention.

Also, as illustrated in the graphs of FIGS. 4 and 5, the data processing device 14 may be programmed to determine x-axis metrics during the acceleration phase (i.e., the shaded minimum region in FIGS. 4 and 5) and the braking phase (i.e., the shaded maximum region in FIGS. 4 and 5), such as the peak $F_x$ acceleration force, the peak $F_x$ braking force, and efficiency ratios. During a baseball swing, the acceleration phase is when the baseball player is accelerating toward the pitcher, while the braking phase is when the baseball player is putting on the brakes, and applying force away from the pitcher. Turning again to FIG. 4, the peak $F_x$ acceleration force is the lowest point in the shaded minimum region of FIG. 4, while the peak $F_x$ braking force is the highest point in the shaded maximum region of FIG. 4. In the illustrative embodiment, the data processing device 14 also may be programmed to determine the efficiency ratios for the impulse and the force. For example, considering the $F_x$ force curve depicted in FIG. 5, the data processing device 14 may be programmed to compute the ratio of the braking impulse to the acceleration impulse as follows:

$$68216 \text{ N·s}/-120448 \text{ N·s} = -0.57 \quad (3)$$

As another example, considering the $F_x$ force curve depicted in FIG. 5, the data processing device 14 may be programmed to compute the ratio of the braking force to the acceleration force as follows:

$$331 \text{ N}/-206 \text{ N} = -1.60 \quad (4)$$

Advantageously, these efficiency ratios give insight into transfer of energy and force from the acceleration phase to the braking phase. Also, the time from the peak acceleration force to the peak braking force in the graph of FIG. 5 is indicative of how quickly the baseball player transfers from accelerating to braking movement. In FIG. 5, the time peak acceleration is at lowest point in the shaded minimum region of FIG. 5, while the time peak brake is at the highest point in the shaded maximum region of FIG. 5. As such, considering the $F_x$ force curve depicted in FIG. 5, the data processing device 14 may be programmed to compute the time from the peak acceleration force to the peak braking force as follows:

$$2.99 \text{ sec} - 2.75 \text{ sec} = 0.24 \text{ sec} \quad (5)$$

Figure 6:
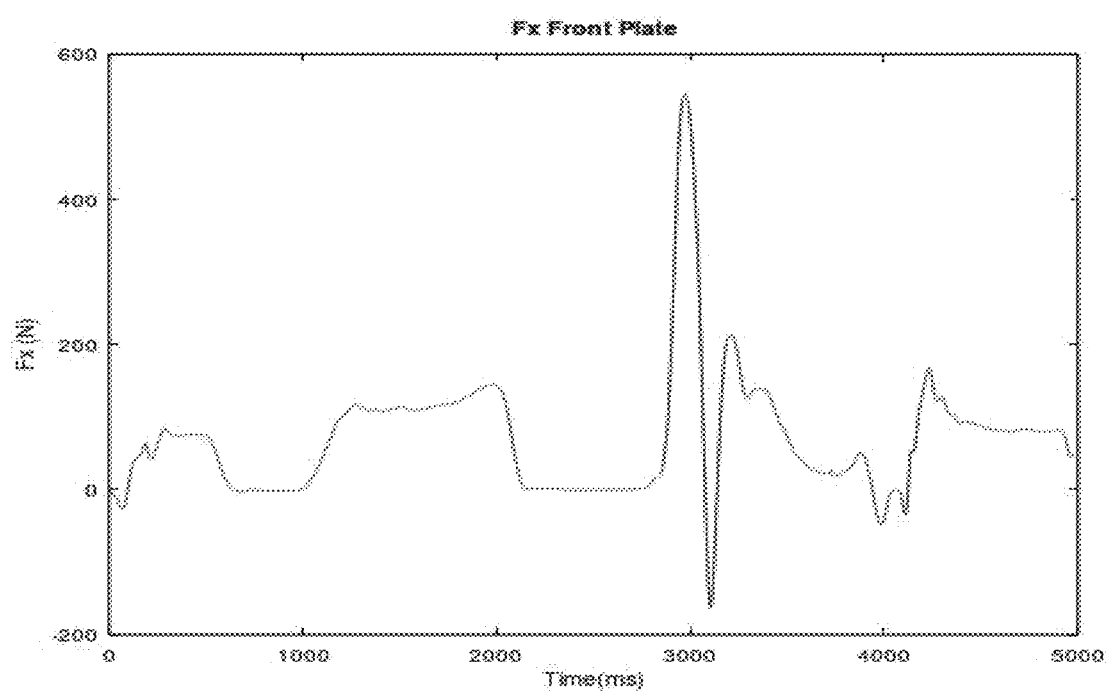
FIG. 6 is a graph illustrating an x-axis force curve generated during a baseball swing for a front force plate, according to an embodiment of the invention.
Figure 7:
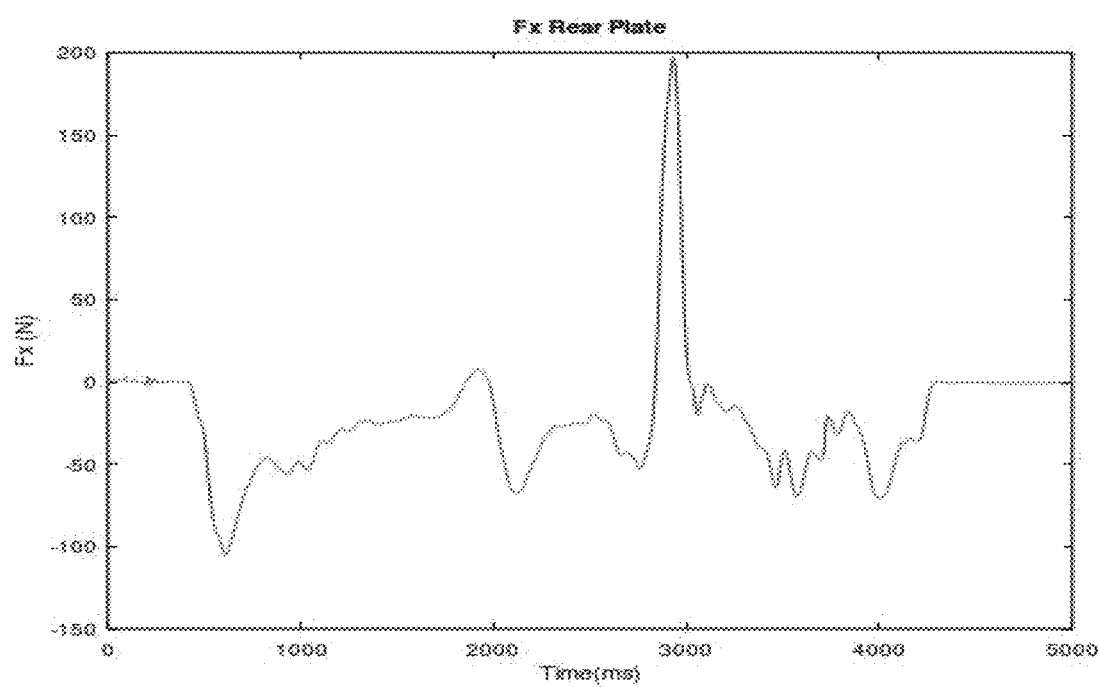
FIG. 7 is a graph illustrating an x-axis force curve generated during a baseball swing for a rear force plate, according to an embodiment of the invention.

Additional x-axis metrics determined by the data processing device 14 in the illustrative embodiment will be discussed with reference to FIGS. 6 and 7. FIG. 6 depicts the $F_x$ force curve for the front plate, while the FIG. 7 depicts the $F_x$ force curve for the rear plate. The rear plate $F_x$ force corresponding to the point in time when the front plate $F_x$ force reaches its maximum value gives insight on how much force is being left on the back side by the baseball player before contact with the ball. This rear plate force may be taken as a percentage of maximum force to give an idea of how much force is being left on the back side. For example, considering the $F_x$ force curves depicted in FIGS. 6 and 7, the data processing device 14 may be programmed to compute the ratio of the rear plate $F_x$ force at the time when the front plate Fx force reaches its maximum value to the peak rear plate $F_x$ force as follows:

$$75 \text{ N}/200 \text{ N} = 37.5\% \quad (6)$$

Figure 8:
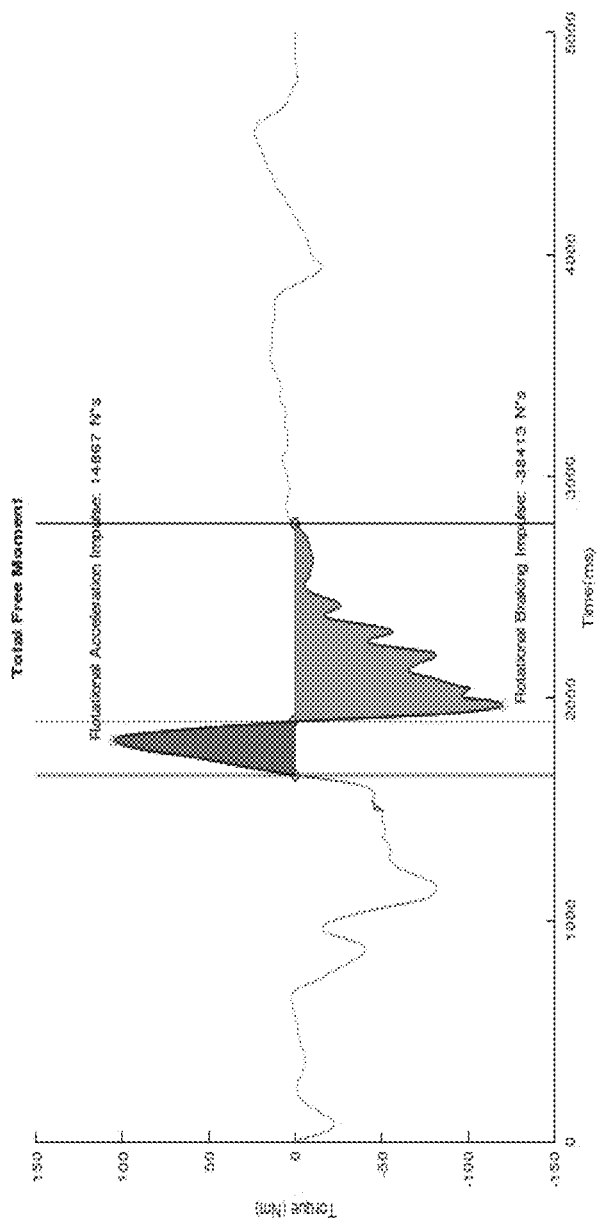
FIG. 8 is a graph illustrating a torque curve generated during a baseball swing where the rotational acceleration phase and the rotational braking phase of the baseball swing are depicted, according to an embodiment of the invention.

In addition, as illustrated in the graph of FIG. 8, the data processing device 14 may be programmed to determine torque metrics during the rotational acceleration phase (i.e., the shaded maximum region in FIG. 8) and the rotational braking phase (i.e., the shaded minimum region in FIG. 8), such as the peak rotational acceleration torque and the peak rotational braking torque. During a baseball swing, the rotational acceleration phase is when the baseball player is rotating towards the baseball, while the rotational braking phase is when the baseball player is rotating away from the baseball. During the rotational braking phase, the baseball player is trying to stop over-rotating by "applying the brakes" in the rotational sense. The torque metrics determined by the data processing device 14 also may be used to automatically determine the handedness of the baseball player. Turning again to FIG. 8, the peak rotational acceleration torque is the highest point in the shaded maximum region of FIG. 8, while the peak rotational braking torque is the lowest point in the shaded minimum region of FIG. 8. In FIG. 8, the torque on the y-axis of the graph is the moment about the center of pressure (COP).

Figure 9:
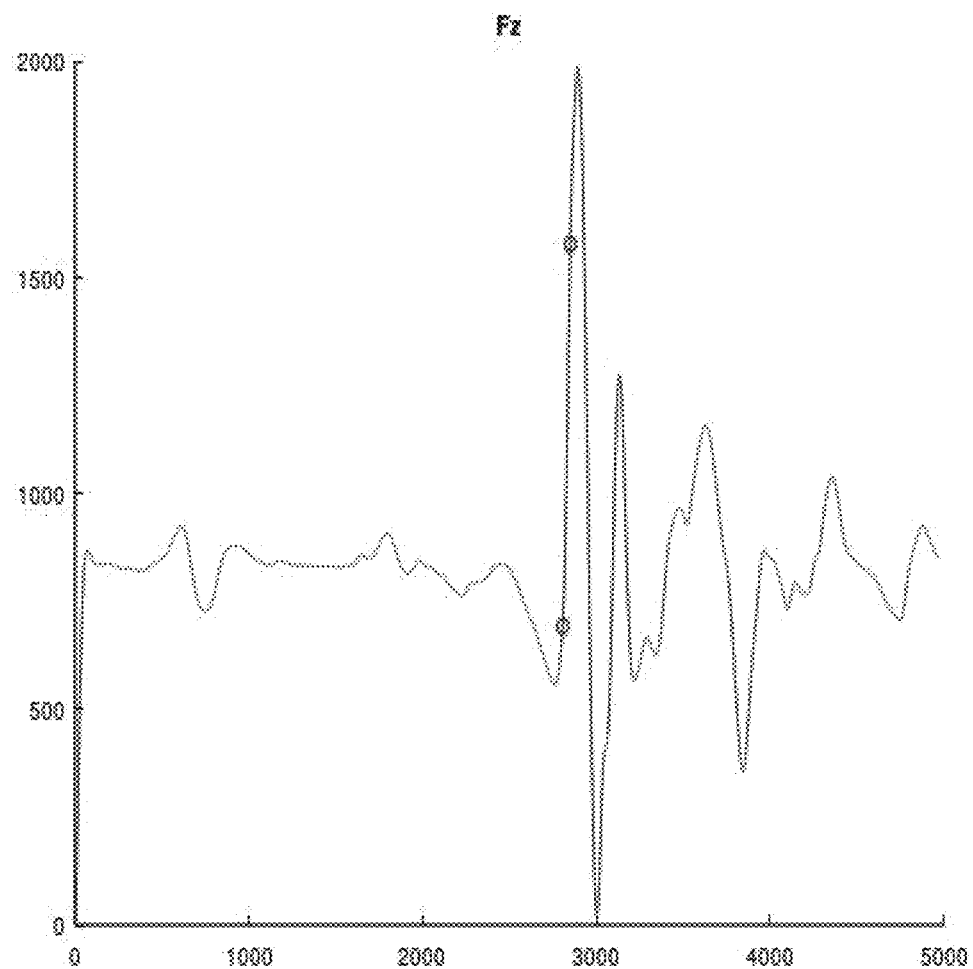
FIG. 9 is a graph illustrating a rate of force development along the z-axis, according to an embodiment of the invention.
Figure 10:
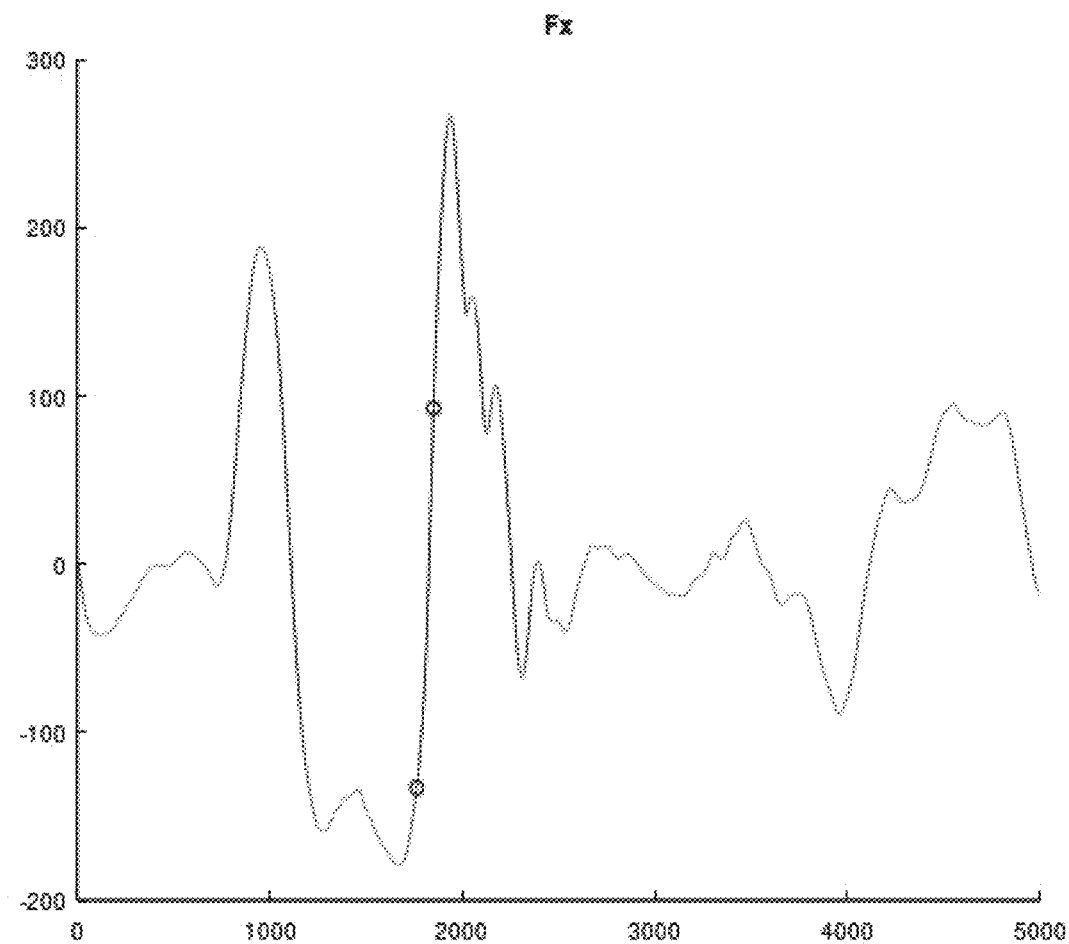
FIG. 10 is a graph illustrating a rate of force development along the x-axis, according to an embodiment of the invention.
Figure 11:
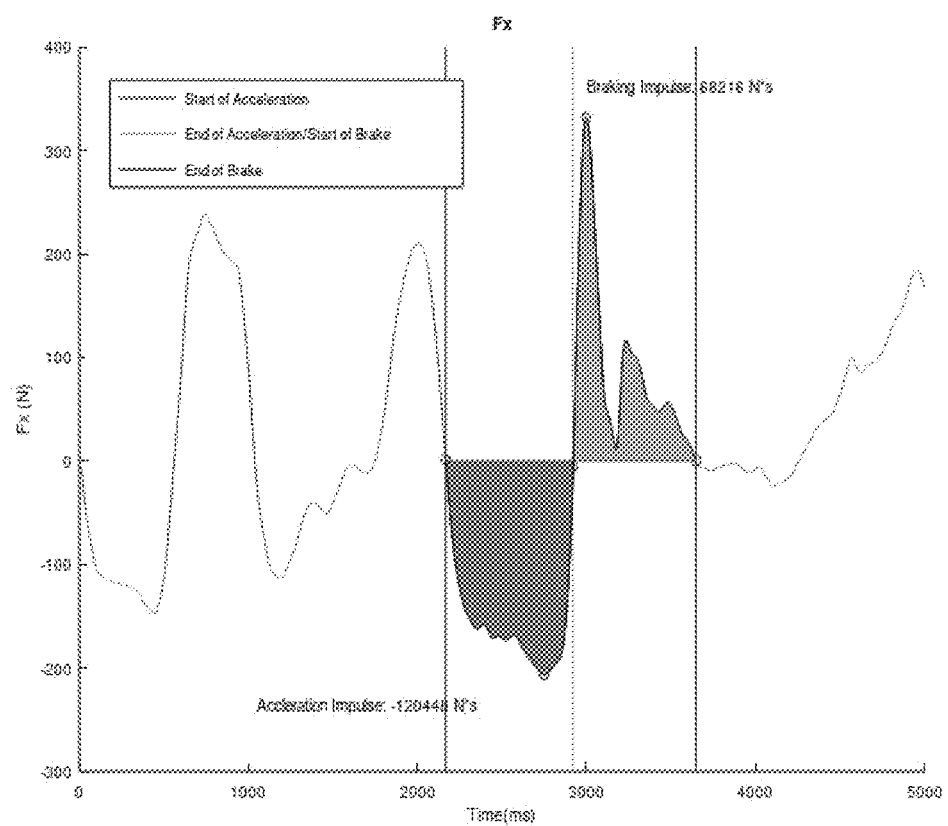
FIG. 11 is yet another graph illustrating an x-axis force curve generated during a baseball swing where the acceleration phase and the braking phase of the baseball swing are depicted, according to an embodiment of the invention.
Figure 12:
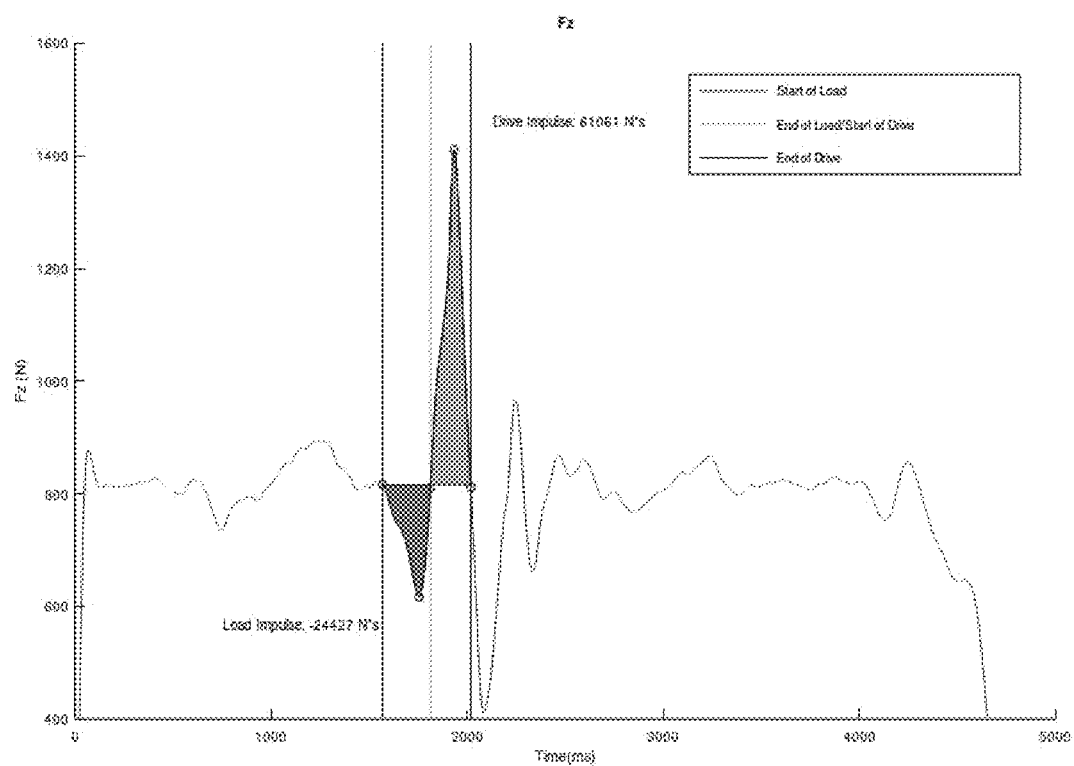
FIG. 12 is a graph illustrating a z-axis force curve generated during a baseball swing where the load phase and the driving phase of the baseball swing are depicted, according to an embodiment of the invention.

Further, with reference to FIGS. 9 and 10 respectively, the rate of force development along the z-axis and x-axis may be determined by the data processing device 14. For example, when the rate of force development is computed between the two (2) encircled points on the $F_z$ force curve in FIG. 9, the data processing device 14 determines that the rate of $F_z$ force development is 4367 N/s. As another example, when the rate of force development is computed between the two (2) encircled points on the $F_x$ force curve in FIG. 10, the data processing device 14 determines that the rate of $F_x$ force development is 1739 N/s.

In the illustrative embodiment, the data processing device 14 also may be programmed to determine the vertical/horizontal brake ratio for the baseball player. The vertical/horizontal brake ratio is the ratio of the vertical positive impulse and the horizontal negative impulse, and the vertical/horizontal brake ratio gives insight into whether more braking is happening horizontally or vertically. For example, considering the $F_x$ and $F_z$ force curves depicted in FIGS. 11 and 12, respectively, the data processing device 14 may be programmed to compute the vertical/horizontal brake ratio as follows:

$$68216 \text{ N·s}/61060 \text{ N·s} = 1.12 \quad (7)$$

Figure 13:
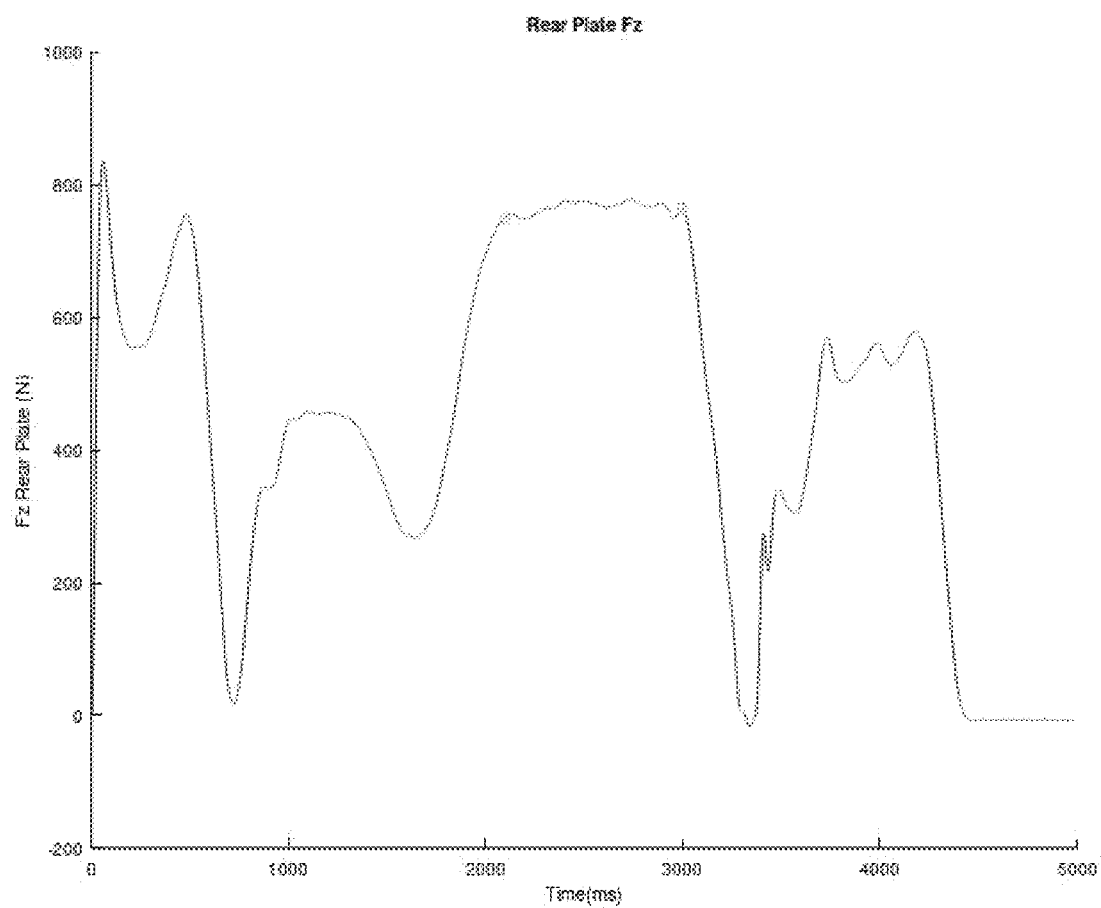
FIG. 13 is a graph illustrating a z-axis force curve generated during a baseball swing for a rear force plate from which the load quality is determined, according to an embodiment of the invention.
Figure 14:
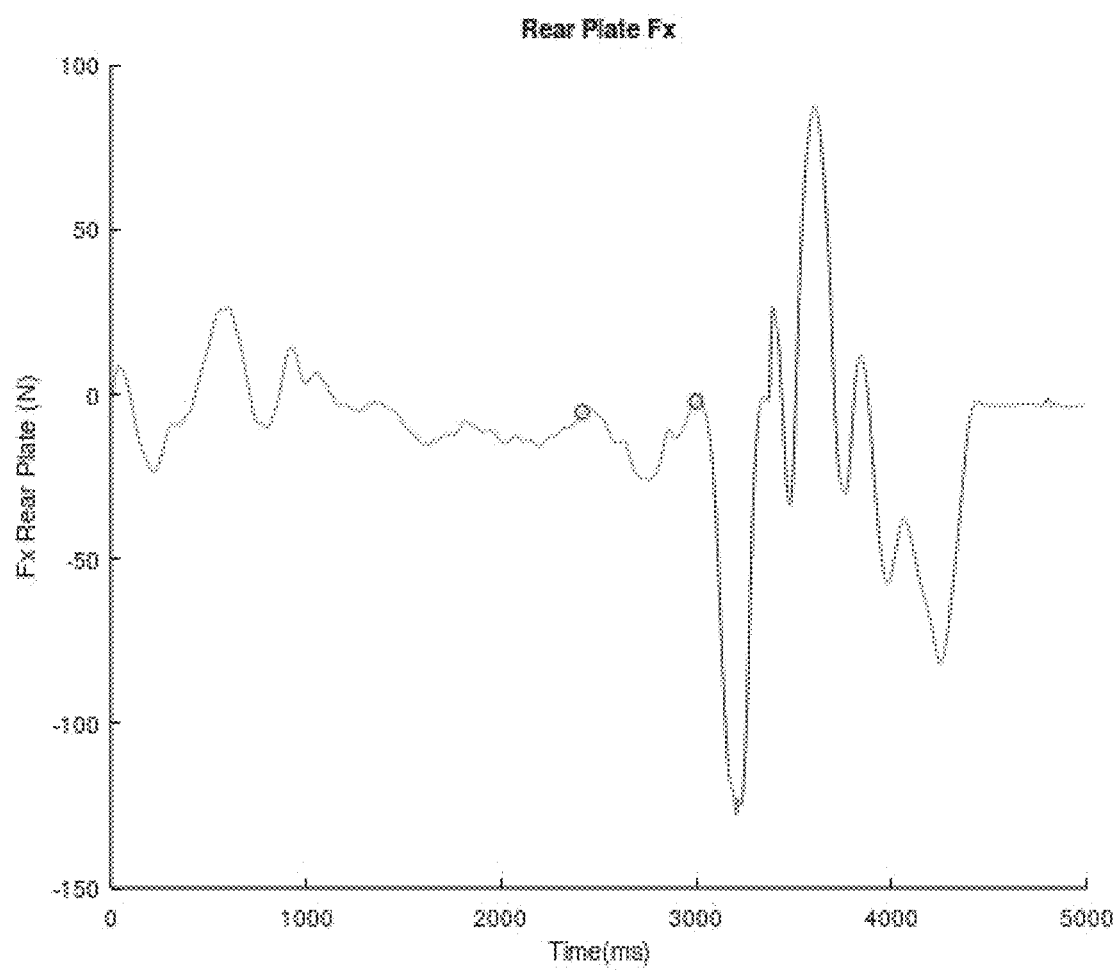
FIG. 14 is a graph illustrating an x-axis force curve generated during a baseball swing for a rear force plate from which the load variability is determined, according to an embodiment of the invention.
Figure 15:
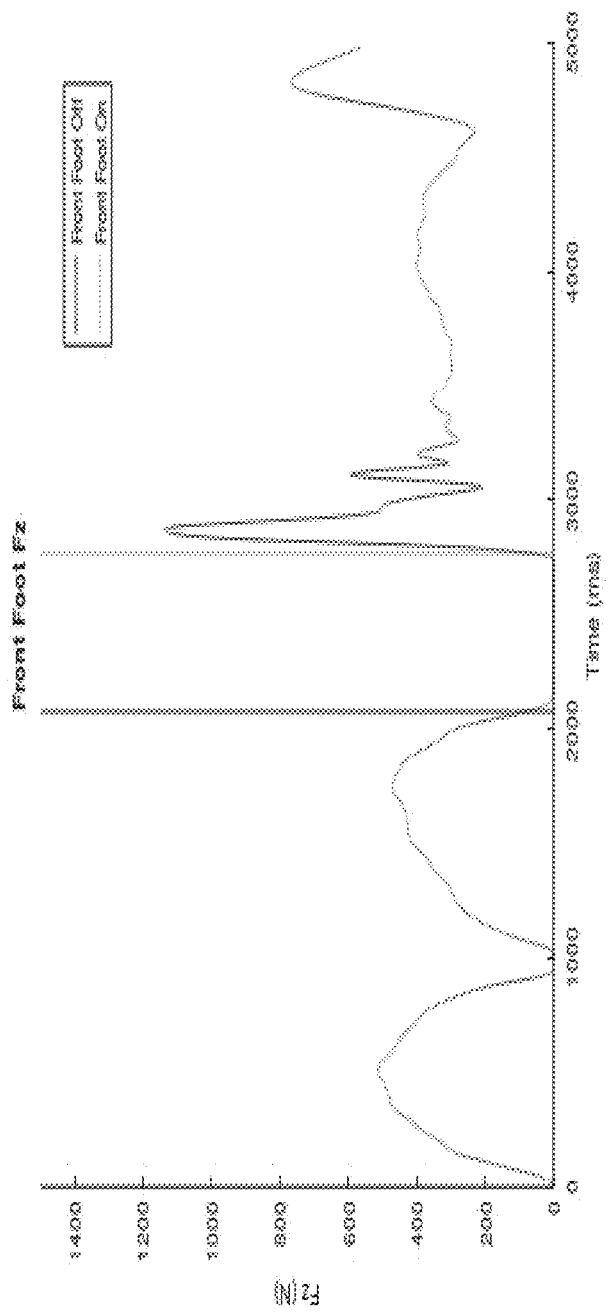
FIG. 15 is a graph illustrating a z-axis force curve generated during a baseball swing for the front foot of the baseball player, according to an embodiment of the invention.

Turning to FIGS. 13 and 14, the data processing device 14 additionally may be programmed to determine the load quality and load variability for the baseball player. First of all, using the rear force plate $F_z$ plot in FIG. 13, the standard deviation is taken between the beginning and end of the load phase on the back side. This standard deviation is subtracted to 100 to create a load quality z score. The closer to 100, the more consistent the load. For the exemplary data depicted in FIG. 13, the standard deviation is 6.24. As such, the load quality is determined by the data processing device 14 as follows:

$$\text{Load Quality } Z: 100 - 6.24 = 93.76 \quad (8)$$

Secondly, using the rear force plate $F_x$ plot in FIG. 14, the same process can be completed using these points on the $F_x$ rear force plate plot to find a load quality x score. For the exemplary data depicted in FIG. 14, the standard deviation is 7.38. As such, the load variability is determined by the data processing device 14 as follows:

$$\text{Load Variability } X: 100-7.38=92.62 \quad (9)$$

The data processing device 14 may calculate the load quality as the average between Load Quality Z and Load Variability X as follows:

$$\text{Load Quality}=(93.76+92.62)/2=93.19 \quad (10)$$

Figure 16:
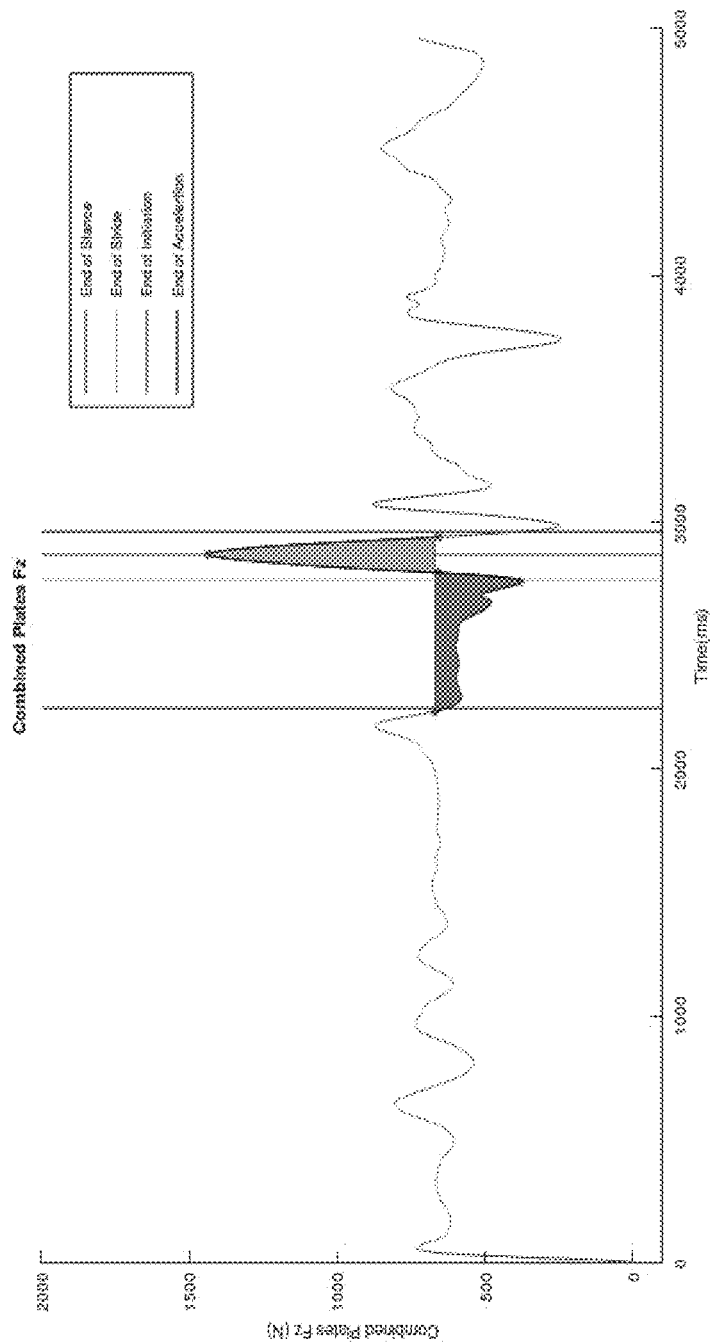
FIG. 16 is a graph illustrating a z-axis force curve generated during a baseball swing for the combined front and rear force plates from which the baseball swing phases are autodetected, according to an embodiment of the invention.

In the illustrative embodiment, the data processing device 14 additionally may be programmed to determine baseball swing phases for the baseball player. For example, the data processing device 14 may be programmed to determine the following baseball swing phases for the baseball player: (i) stance (i.e., ready position to lead leg off), (ii) stride (i.e., lead leg off to BW>≈10%), (iii) coiling, (iv) swing initiation (i.e., lead leg>≈10% to peak force), (v) swing acceleration (i.e., peak force to contact), and (vi) follow through. As part of the determination of the baseball swing phases, the data processing device 14 may be programmed to determine the on and off positions of the front foot (refer to FIG. 15). In addition, as shown in FIG. 16, the data processing device 14 may be programmed to autodetect the baseball swing phases. In addition to performing autodetection of swing phases for the baseball swing, the data processing device 14 may be further programmed to perform phase autodetection for a golf swing, a countermovement jump, and a squat jump. The data processing device 14 also may be programmed to determine the right or left handedness of a swing (e.g., a baseball swing or golf swing), specific movements within a swing (e.g., front foot on/off, propulsion, braking, follow through), and shifts in bodyweight during a swing.

In the illustrative embodiment, the data processing device 14 of the swing analysis system 100 is programmed to output the swing performance metrics described above for the front force plate of the force measurement assembly 22, the rear force plate of the force measurement assembly 22, or both the front and rear force plates of the force measurement assembly 22. Also, in the illustrative embodiment, the data processing device 14 may be programmed to compute impulses, peak forces and/or torques, a rate of force development, and other performance metrics for the front force plate and/or rear force plate of the force measurement assembly 22. In addition, the swing performance metrics described above may be determined using one or two force plates of the swing analysis system 100 (i.e., either the front force plate or the rear force plate, or both the front and rear force plates).

Figure 17:
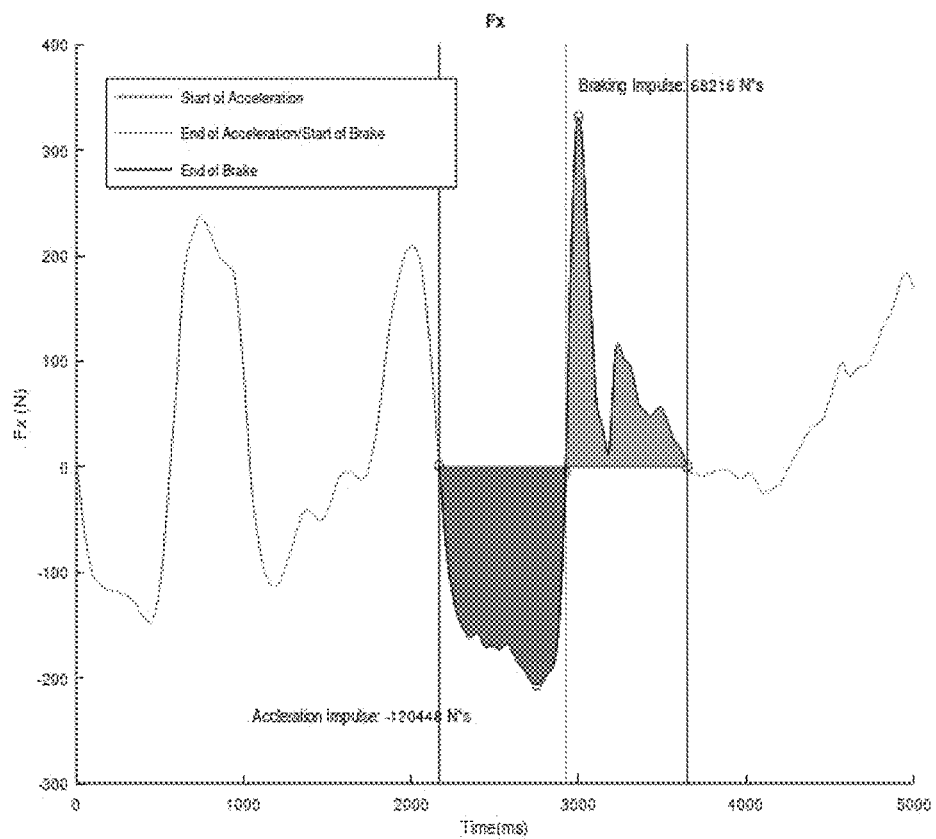
FIG. 17 is a graph illustrating an x-axis force curve generated during a baseball swing from which the acceleration impulse and the deceleration impulse are determined, according to an embodiment of the invention.

In the illustrative embodiment, the data processing device 14 further may be programmed to generate a baseball swing report with various swing performance metrics determined from the force plate output data. For example, as shown in FIG. 17, the data processing device 14 may be programmed to determine the acceleration impulse for the baseball player, and to include the acceleration impulse in the baseball swing report. The acceleration impulse is indicative of the change in velocity of the baseball player as he or she accelerates toward the pitcher. The acceleration impulse is measured in the x-axis during the stride phase when the baseball player pushes himself or herself forward. This acceleration impulse results in the baseball player moving toward the pitcher with a velocity proportional to the impulse, a higher impulse means the athlete has created more kinetic energy toward the pitcher. As another example, referring again to FIG. 17, the data processing device 14 may be programmed to determine the deceleration or braking impulse for the baseball player, and to include the deceleration or braking impulse in the baseball swing report. The deceleration impulse is indicative of the amount of energy created to stop the forward velocity of the hitter (i.e., in other words, the braking energy of the hitter). Measured in the x-axis, the deceleration impulse is the amount of energy created to stop the forward velocity of the hitter. A higher value of the deceleration impulse means the hitter has a better braking ability.

Figure 18:
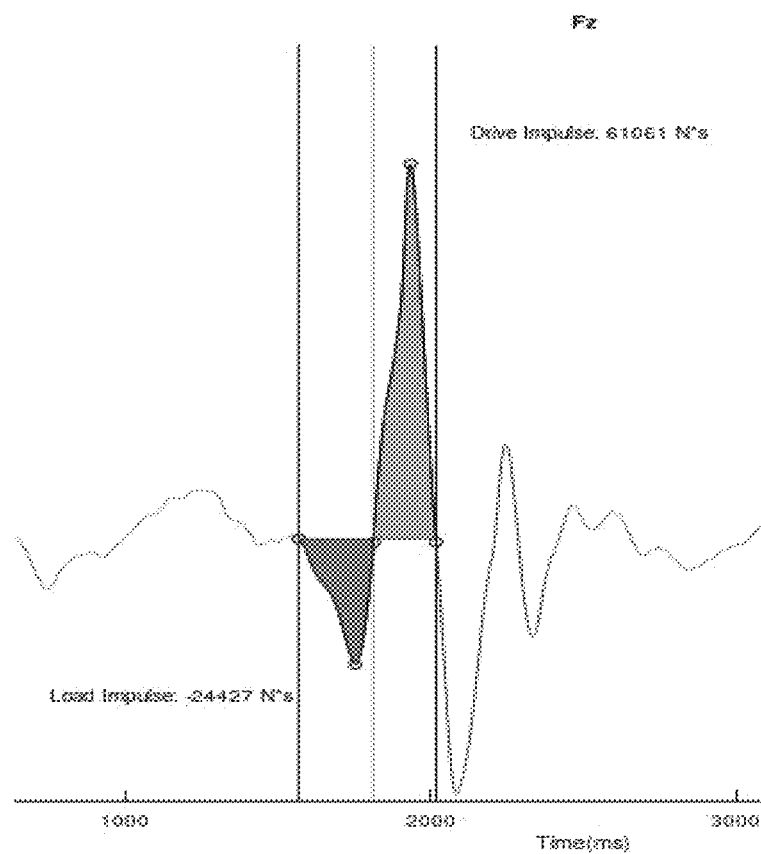
FIG. 18 is a graph illustrating a z-axis force curve generated during a baseball swing from which the load impulse and the drive impulse are determined, according to an embodiment of the invention.

As yet another example, turning to FIG. 18, the data processing device 14 also may be programmed to determine the $F_z$ load impulse for the baseball player, and to include the $F_z$ load impulse in the baseball swing report. The load impulse is indicative of the energy created by the "fall" of the hitter toward the ground. When the hitter sinks toward the ground, he or she creates energy due to the force of gravity. The load impulse is the amount of energy that he or she creates in this phase. The load impulse is calculated by the impulse when the force in the vertical direction becomes less than the body weight of the hitter. The energy that is created as the hitter falls is quantified by the load impulse. As still another example, with reference again to FIG. 18, the data processing device 14 may be programmed to determine the $F_z$ drive impulse for the baseball player, and to include the $F_z$ drive impulse in the baseball swing report. The drive impulse is indicative of the amount of vertical thrust created by the hitter. In long drive golf competitions, athletes typically create such a high drive impulse that they finish the swing in the air. When an athlete jumps off the ground, he or she creates a vertical impulse proportional to his or her jump height. A higher impulse results in a higher jump height and more energy created. In a countermovement jump, the athlete takes advantage of the load and drive impulse to jump higher. The drive impulse is measured as the impulse in the vertical $F_z$ direction where the force generated is above bodyweight. The energy that is created as the hitter pushes into the ground to create vertical thrust is quantified by the drive impulse.

Figure 19:
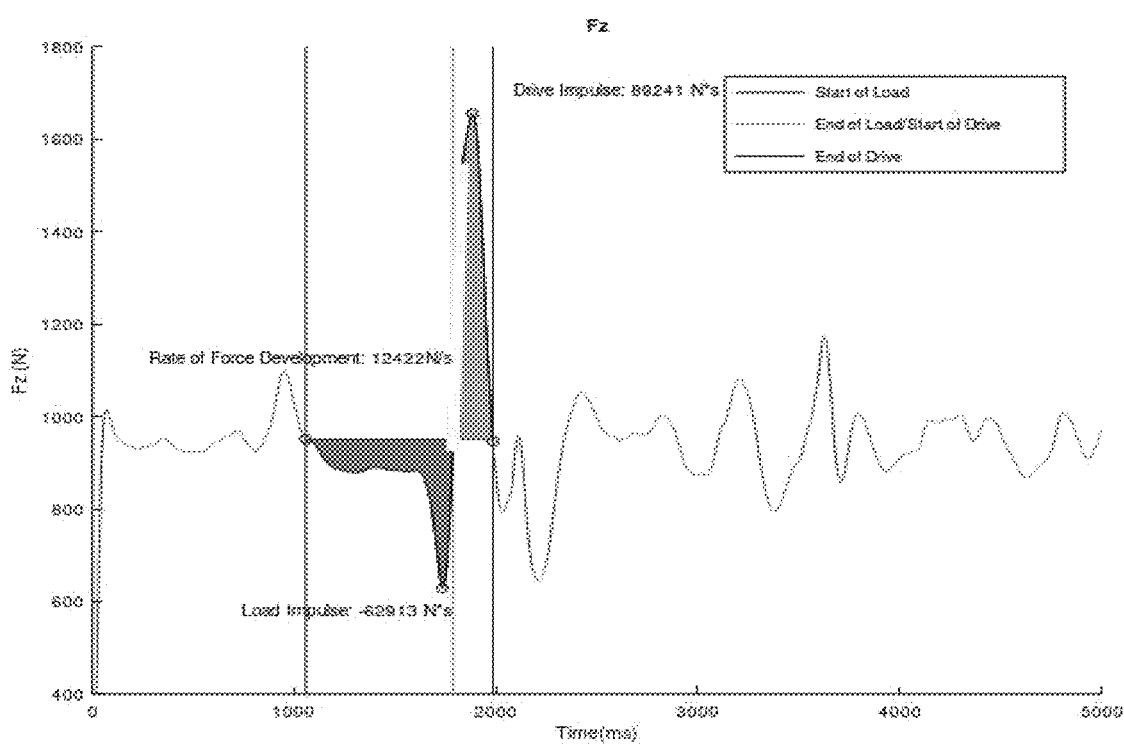
FIG. 19 is another graph illustrating a z-axis force curve generated during a baseball swing from which the load impulse, the drive impulse, and the rate of force development along the z-axis are determined, according to an embodiment of the invention.
Figure 20:
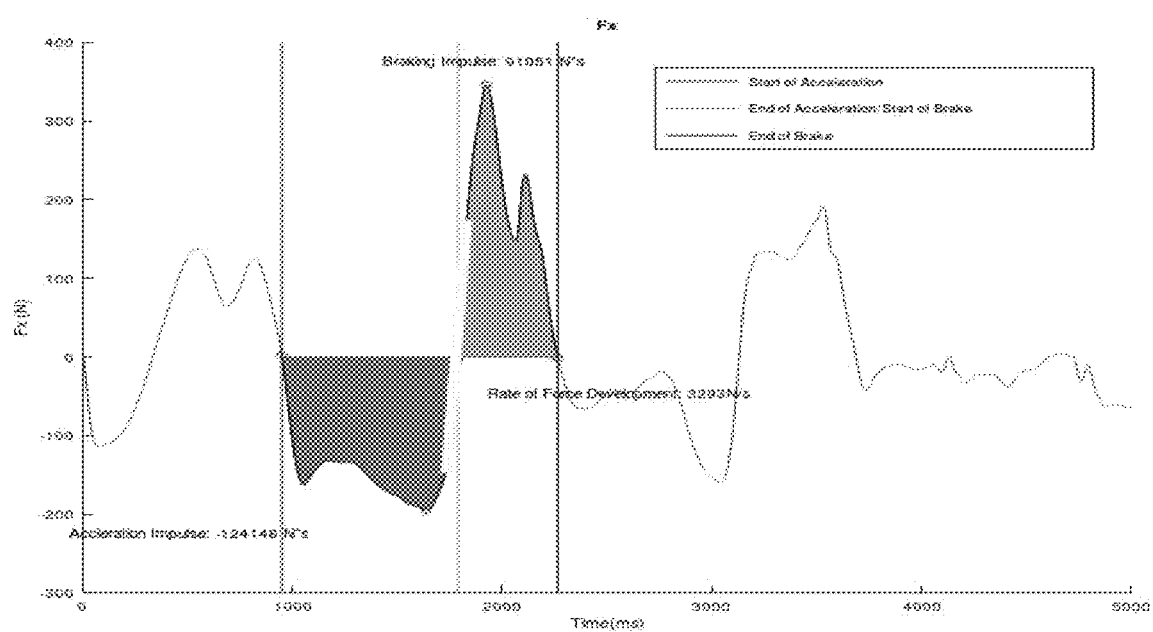
FIG. 20 is another graph illustrating an x-axis force curve generated during a baseball swing from which the acceleration impulse, the deceleration impulse, and the rate of force development along the x-axis are determined, according to an embodiment of the invention.

As yet another example, turning to FIG. 19, the data processing device 14 additionally may be programmed to determine the rate of force development along the z-axis for the baseball player, and to include the rate of force development along the z-axis in the baseball swing report. In addition, as shown in FIG. 20, the data processing device 14 may be programmed to determine the rate of force development along the x-axis for the baseball player, and to include the rate of force development along the x-axis in the baseball swing report. An exemplary baseball swing report may include the following swing performance metrics:

Max $F_z$ Drive Force: 1655 N
Max $F_z$ Load Force: 629 N
Max $F_x$ Acceleration Force: −194 N
Max $F_x$ Braking Force: 346 N
Rate of Force Development x-axis: 3293 N/s
Rate of Force Development z-axis: 12422 N/s
Load Quality: 91.26

Figure 21:
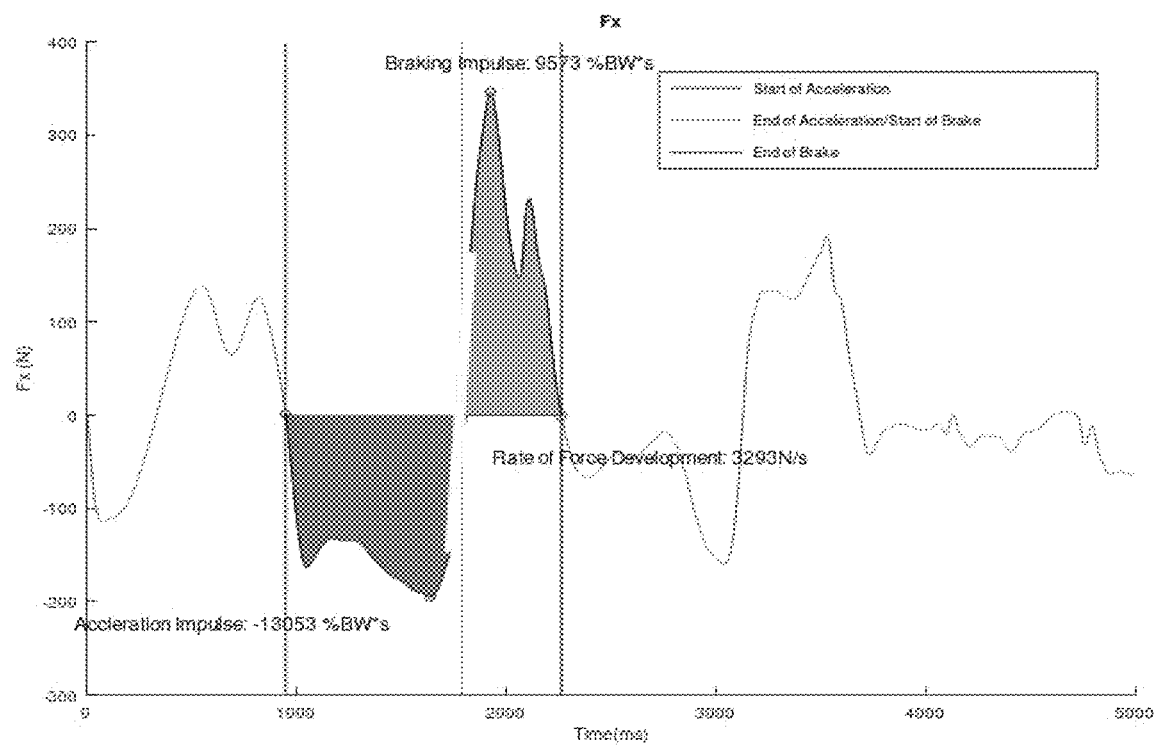
FIG. 21 is yet another graph illustrating an x-axis force curve generated during a baseball swing from which the acceleration impulse, the deceleration impulse, and the rate of force development along the x-axis are determined, according to an embodiment of the invention.
Figure 22:
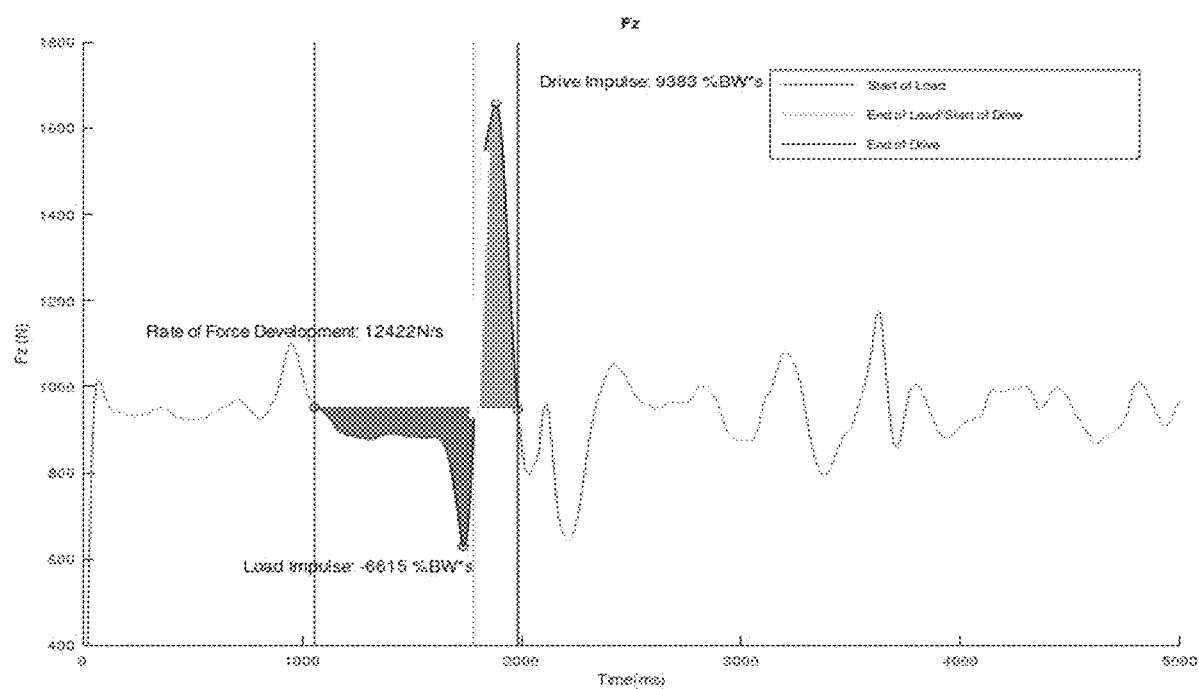
FIG. 22 is yet another graph illustrating a z-axis force curve generated during a baseball swing from which the load impulse, the drive impulse, and the rate of force development along the z-axis are determined, according to an embodiment of the invention.

As still another example, turning to FIG. 21, the data processing device 14 also may be programmed to determine braking impulse and the acceleration impulse for the baseball player, and to include the braking impulse and the acceleration impulse in the baseball swing report. In addition, as shown in FIG. 22, the data processing device 14 may be programmed to determine the drive impulse and the load impulse for the baseball player, and to include the drive impulse and the load impulse in the baseball swing report. An exemplary baseball swing report may include the following swing performance metrics (where "% BW" is percent of body weight):

Max $F_z$ Drive Force: 174% BW (N)
Max $F_z$ Load Force: 66% BW (N)
Max $F_x$ Acceleration Force: 20% BW (N)
Max $F_x$ Deceleration Force: 36% BW (N)
Drive Impulse: 9383% BW*s (N*s)
Load Impulse: 6615% BW*s (N*s)
Acceleration Impulse: 13503% BW*s (N*s)
Braking Impulse: 9573% BW*s (N*s)

In one or more other illustrative embodiments, the baseball swing report may include any combination of the following swing performance metrics: (i) momentum impulse, (ii) load, (iii) drive, (iv) acceleration, (v) deceleration, (vi) load variability, (vii) rate of force development, and (viii) peak force.

Figure 23:
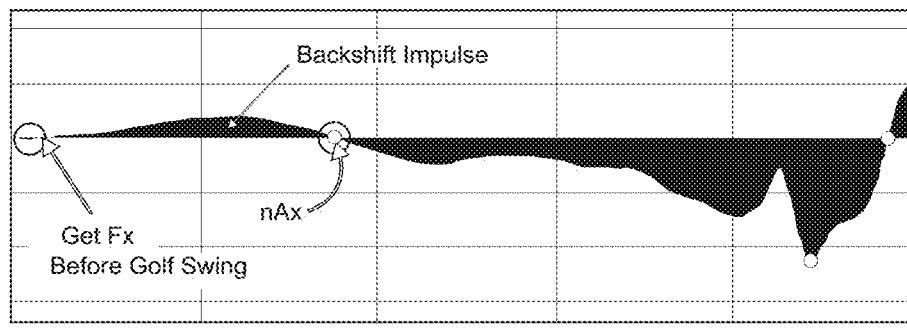
FIG. 23 is yet another graph illustrating a x-axis force curve generated during a golf swing from which the golf backshift impulse is determined, according to an embodiment of the invention.

As yet another example, turning to FIG. 23, the data processing device 14 also may be programmed to determine the backshift impulse of a golf swing for a golfer. The golf backshift impulse is calculated as the integral of the $F_x$ force curve before the acceleration phase by the data processing device 14. More specifically, the data processing device 14 calculates the area of the $F_x$ force curve when the force is above zero before nAx (see FIG. 23). This is when the golfer initially shifts back before putting force towards the ball in the acceleration phase. The value nAx is proximate to the last moment before the transition from the backswing to the downswing of the golfer.

Figure 24:
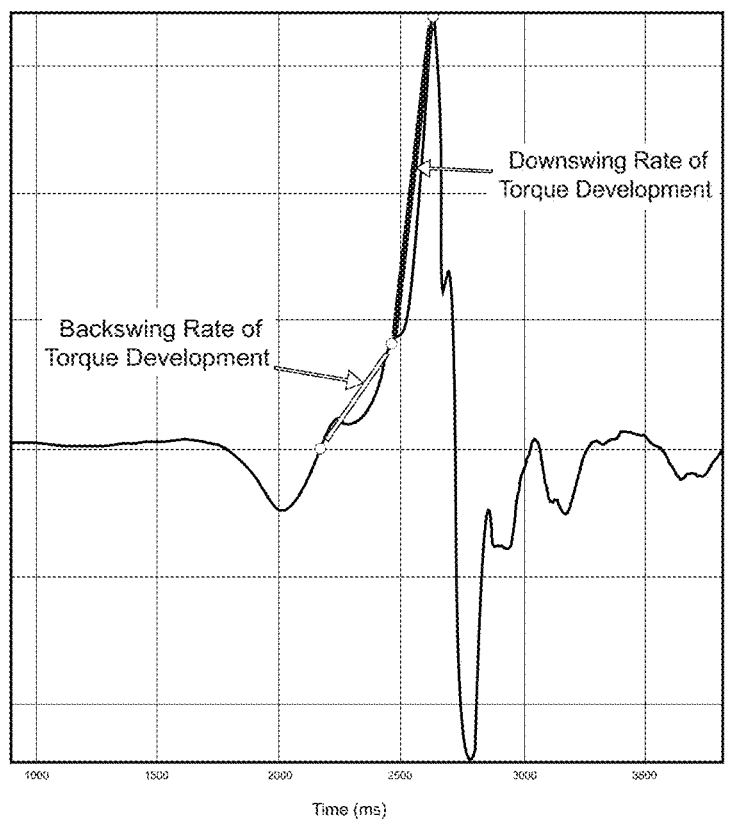
FIG. 24 is a graph illustrating a moment about the z-axis generated during a golf swing from which the golf downswing rate of torque development is determined, according to an embodiment of the invention.

As still another example, turning to FIG. 24, the data processing device 14 also may be programmed to determine the golf backswing rate of torque development of a golf swing for a golfer. The golf backswing rate of torque development is calculated by the data processing device 14 as the slope of the $M_z$ swing torque curve from the instance $M_z$ becomes positive to nAz (see FIG. 24). This is when the golfer is in the backswing and nAz is around the last moment before the transition from backswing to downswing. The data processing device 14 may calculate the golf backswing rate of torque development (RTD) as follows:

Backswing RTD=(Mz(nBmz)−Mz(nAmz))−(nBmz−nAmz)     (11)

nAmz=first moment $M_z$ is above 0 in the backswing     (12)

nBmz=nBz     (13)

In equation (13) above, nBz is the index of min Fz load.

As yet another example, turning to FIG. 24, the data processing device 14 also may be programmed to determine the golf downswing rate of torque development of a golf swing for a golfer. The golf downswing rate of torque development is calculated by the data processing device 14 as the slope of the $M_z$ swing torque curve from nAz to peak $M_z$ (see FIG. 24). This is when the golfer is in the downswing and peak $M_z$ is around ball contact. The data processing device 14 may calculate the golf downswing rate of torque development (RTD) as follows:

Downswing RTD=(Mz(nCmz)−Mz(nBmz))−(nCmz−nBmz)     (14)

nBmz=nBz     (15)

nCmz=max(Mz);     (16)

In equation (15) above, nBz is the index of min Fz load.

As still another example, the data processing device 14 also may be programmed to determine the time to contact during a baseball swing. The data processing device 14 determines the time to contact during the baseball swing by subtracting a first time instance when a foot of the user is put back down on the ground at the end of a stride phase from an estimated time to ball contact. The data processing device 14 may calculate the time to contact during a baseball swing as follows:

TimeToContact=TimeBallContact−TimeFrontFootOn     (17)

In equation (17) above, "TimeFrontFootOn" is the event point (i.e., time location) of when the foot of the baseball player is put back down on the ground, marking the end of the stride phase.

Figure 25:
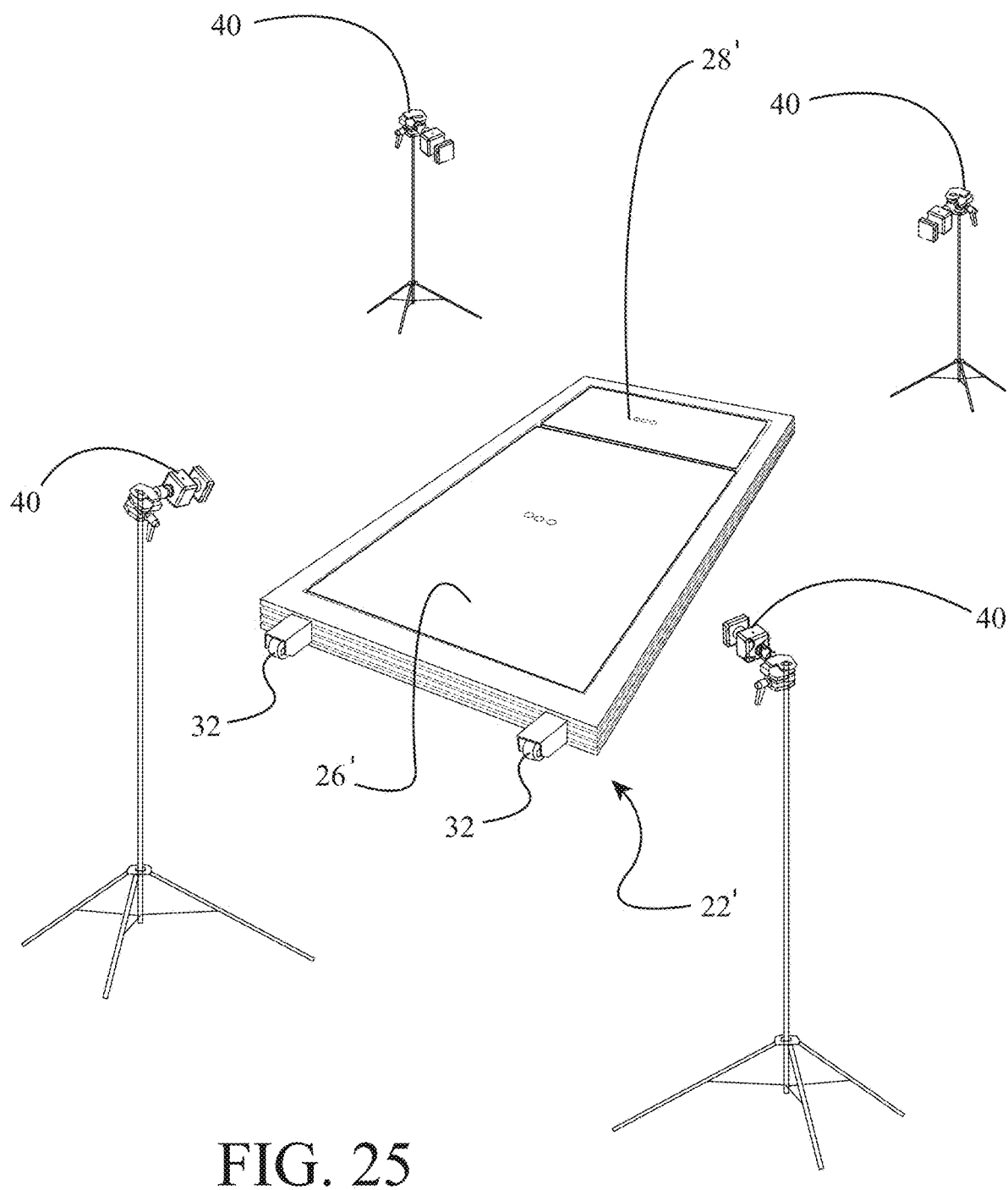
FIG. 25 is a perspective view of a swing analysis system that includes a force measurement assembly and a motion capture system, according to another illustrative embodiment of the invention.

In a further illustrative embodiment of the swing analysis system 100, the system 100 uses a combination of the force measurement assembly 22' (e.g., a force plate) and a motion capture system (see FIG. 25) that obtains images of a user swinging an object (e.g., a golf club or baseball bat) via computer vision algorithms by triangulating positions with multiple RGB (red green blue) video cameras 40. The body keypoint positions (joints) are detected, and the center of mass (COM) of the body is determined based on the body keypoint positions. The location of the force plate 22' relative to the body is also recognized, such that the moment about the center of mass is able to be determined. In the illustrative embodiment of FIG. 25, the force measurement assembly 22' is provided with a pair of wheels 32 thereon so that the dual force plate is able to be easily transported from one location to another location.

In one or more embodiments, a remote server may be used to process the camera data collected on the local computing device, which is operatively coupled to the cameras 40. The remote server may be connected to local computing device via an internet connection so as to enable cloud processing of the camera data. Advantageously, cloud processing enables users to obtain output data without having a powerful graphics processing unit (GPU) on the local computing device to analyze the markerless motion capture data using the one or more trained neural networks.

In this further illustrative embodiment, the center of mass of the body is obtained using computer vision and processing algorithms. First, the body center of mass (COM) and the location of the force plate relative to the COM is obtained. Then, the moment about the center of mass is calculated using COM position data and the global ground reaction forces from the force plate. Also, because computer vision results are obtained, enhanced phase detection and kinematic processing also is able to be performed. In this further illustrative embodiment, phase detection of the following is additionally performed: (i) start of the swing (swing initiation), (ii) top of backswing, and (iii) ball contact.

In this further illustrative embodiment, an input of 2-4 RGB video cameras 40 may be used. Also, the swing analysis system 100 uses a computer vision algorithm to obtain 17 or more keypoint locations on the human subject during a swinging motion. The keypoint locations for each frame create a time-series file containing the locations of each keypoint in three-dimensional (3D) space. These keypoints are then processed to output the location of the center of mass in 3D space. For example, the three-dimensional (3D) pose estimation system described in U.S. Pat. No. 10,853,970 may be used to determine the keypoint locations, the entire disclosure of which is incorporated herein by reference.

In this further illustrative embodiment, with reference again to FIG. 25, the force measurement assembly 22' is visible to the motion capture system with cameras 40. The front and rear force plates 26', 28' are detected by the computer vision algorithm and the 3D coordinates of the force plates 26', 28' are input into the 3D coordinate system, such that the human pose and the force plates 26', 28' are in the same 3D reconstruction. Using the 3D data of human and force plates 26', 28', the value of the moment (torque) about the center of mass of the human subject is calculated by the data processing device 14 for each frame/sample. This information is used by swing coaches to optimize the moment and create a higher velocity bat or clubhead speed.

Additionally, in this further illustrative embodiment, the keypoint time series information may be used by the data processing device 14 to do an algorithmic analysis of the kinematic data of the human subject. The data processing device 14 may calculate the angular position, velocity, and acceleration of the body segments for each frame.

Figure 26:
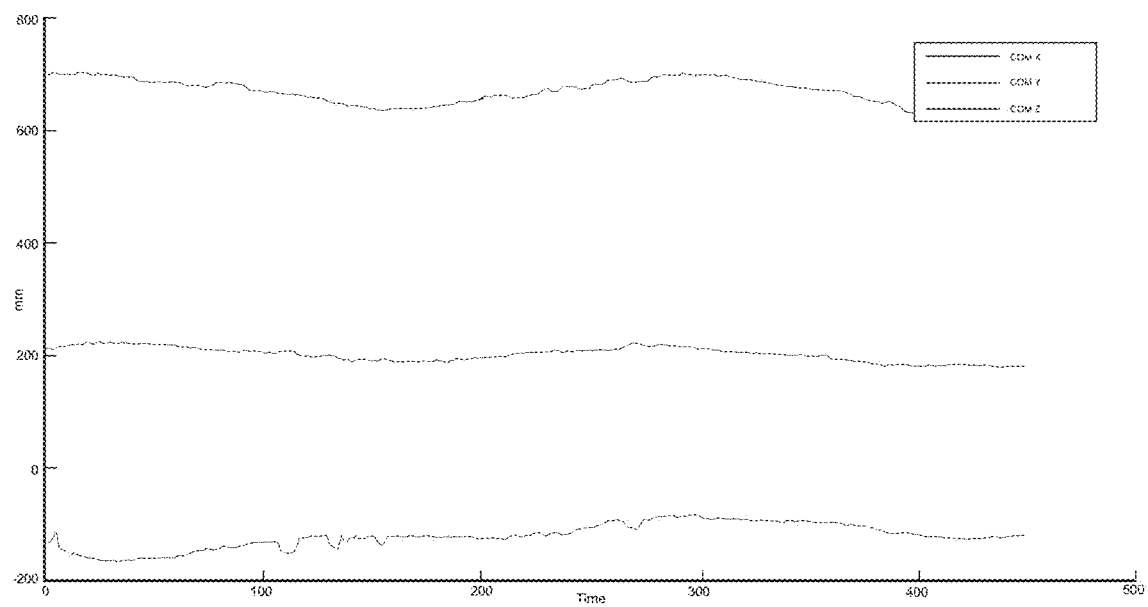
FIG. 26 is a graph illustrating overall body center of mass coordinates for a user over a period of time, according to an embodiment of the invention.
Figure 27:
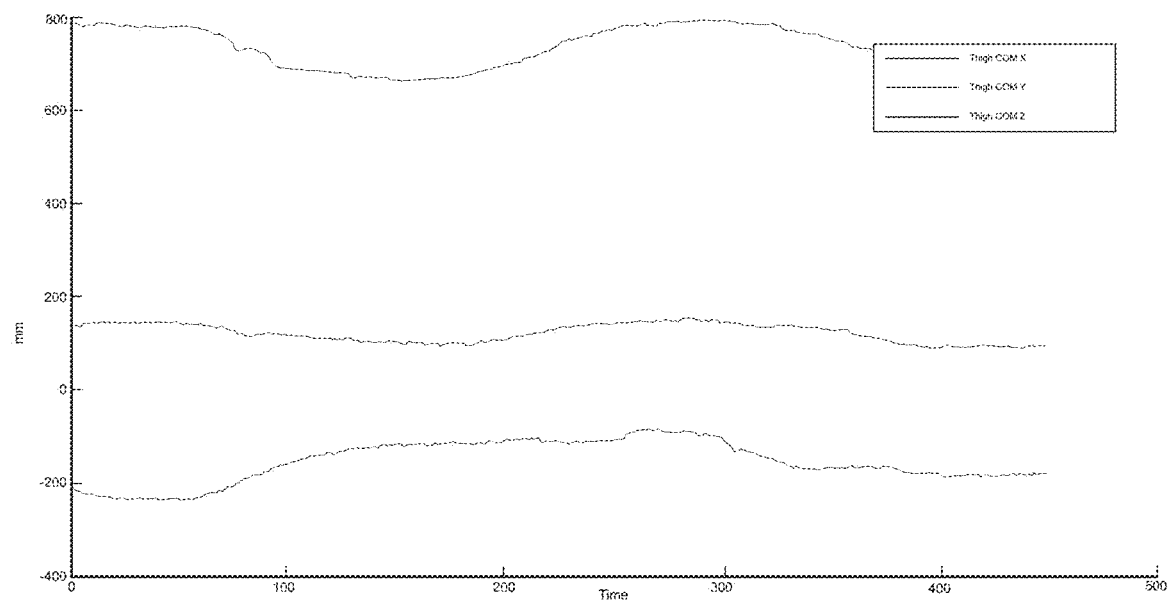
FIG. 27 is a graph illustrating thigh body segment center of mass coordinates for a user over a period of time, according to an embodiment of the invention.

Now, the details of this further illustrative embodiment will be described in more detail with reference to FIGS. 25-29. Initially, in the system 100 of FIGS. 2 and 25, the data processing device 14 calculates the center of mass (COM) of each body segment in each direction (x, y, z) using body keypoint estimates to find body segment lengths, and then multiplying those lengths by segment length percentages to find a position for the segment center of mass in all three directions. Then, once the segment centers of mass are determined, the segment centers of mass are used together with segment mass percentages to find the location of the total body center of mass in all three directions. The segment mass and length percentages are based on average values for a typical population. Male and female values for the segment mass and length percentages are averaged for the calculations. For example, in the illustrative embodiment, the data processing device 14 executes the following lines of code in order to determine segment center of mass locations:

headneck(x/y/z)=c7(x/y/z)+(0.5002)*(head(x/y/z)−c7(x/y/z));
trunk(x/y/z) (rshoulder(x/y/z)+lshoulder(x/y/z))/2+(0.413)*(hip(x/y/z)−((rshoulder(x/y/z)+lshoulder(x/y/z))/2));
rupperarm(x/y/z)=rshoulder(x/y/z)+(0.5772)*(relbow(x/y/z)−rshoulder(x/y/z));
lupperarm(x/y/z)=lshoulder(x/y/z)+(0.5772)*(lelbow(x/y/z)−lshoulder(x/y/z));
rforearm(x/y/z)=relbow(x/y/z)+(0.4574)*(rwrist(x/y/z)−relbow(x/y/z));
lforearm(x/y/z)=lelbow(x/y/z)+(0.4574)*(lwrist(x/y/z)−lelbow(x/y/z));
rthigh(x/y/z)=rhip(x/y/z)+(0.4095)*(rknee(x/y/z)−rhip(x/y/z));
lthigh(x/y/z)=lhip(x/y/z)+(0.4095)*(lknee(x/y/z)−lhip(x/y/z));
rshank(x/y/z)=rknee(x/y/z)+(0.4395)*(rankle(x/y/z)−rknee(x/y/z));
lshank(x/y/z)=lknee(x/y/z)+(0.4395)*(lankle(x/y/z)−lknee(x/y/z));

As one example, in the above lines of code, the head-neck segment center of mass location is determined as a function of the c7 keypoint, the head keypoint, and the head-neck segment length percentage. Then, in the illustrative embodiment, the data processing device 14 executes the following lines of code in order to determine the overall body center of mass location:

CM_tot(x/y/z)=headneck(x/y/z)*0.0694+trunk(x/y/z)*0.4346+rupperarm(x/y/z)*0.0271+lupperarm(x/y/z)*0.0271+rforearm(x/y/z)*0.0162+lforearm(x/y/z)*0.0162+rthigh(x/y/z)*0.1416+lthigh(x/y/z)*0.1416+rshank(x/y/z)*0.0433+lshank(x/y/z)*0.0433;

In the above lines of code, the overall body center of mass location is determined as a function of the individual body segment center of mass locations and the segment mass percentages. An exemplary output of the data processing device 14 for the overall body center of mass location (i.e., x, y, z coordinate locations of the overall COM) in millimeters over a period of time is depicted in FIG. 26. An exemplary output of the data processing device 14 for the thigh body segment center of mass location (i.e., x, y, z coordinate locations of the thigh segment COM) in millimeters over a period of time is depicted in FIG. 27.

Figure 28:
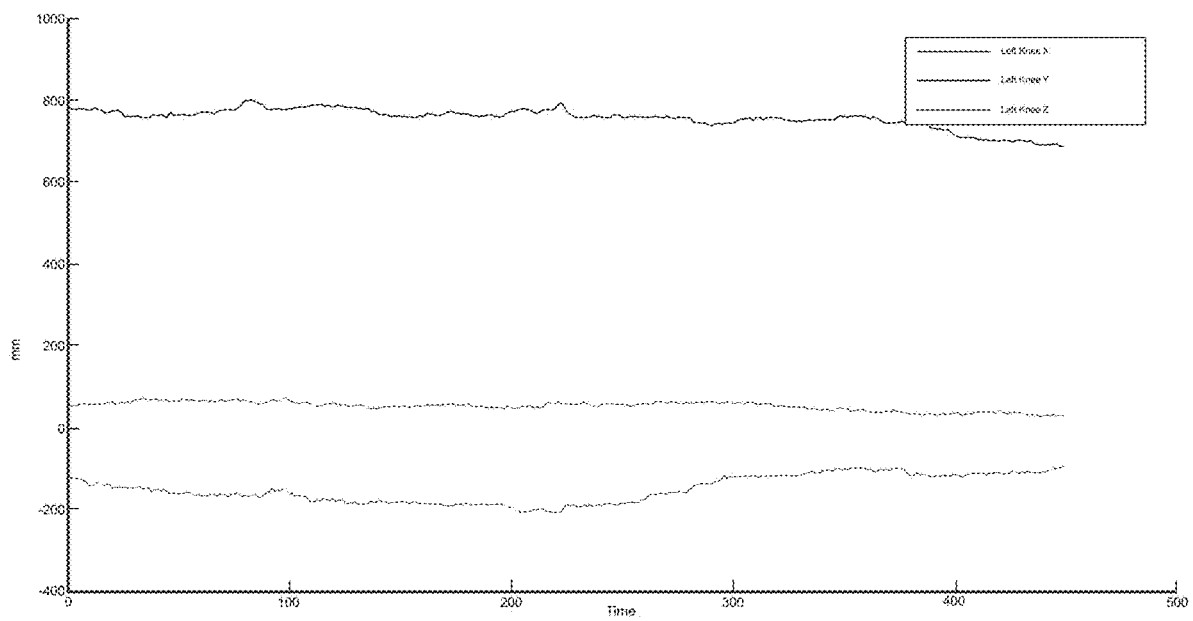
FIG. 28 is a graph illustrating keypoint coordinates for a left knee of a user over a period of time, according to an embodiment of the invention.

In the illustrative embodiment, the data processing device 14 determines the global position coordinates (i.e., x, y, z coordinates) of each keypoint over time by processing the output data from the cameras 40 using one or more trained neural networks (e.g., by using the trained neural networks described in U.S. Pat. No. 10,853,970). In the illustrative embodiment, at least the following keypoints are determined by the data processing device 14: (i) head keypoint, (ii) C7 keypoint, (iii) right shoulder keypoint, (iv) right elbow keypoint, (v) right wrist keypoint, (vi) left shoulder keypoint, (vii) left elbow keypoint, (viii) left wrist keypoint, (ix) sacrum keypoint, (x) right hip keypoint, (xi) right knee keypoint, (xii) right ankle keypoint, (xiii) left hip keypoint, (xiv) left knee keypoint, and (xv) left ankle keypoint. An exemplary output of the data processing device 14 for the left knee keypoint location (i.e., x, y, z coordinate locations of the left knee keypoint) in millimeters over a period of time is depicted in FIG. 28.

Also, in the illustrative embodiment, the data processing device 14 determines the global angle of each body segment in the x, y, and z planes. More specifically, in the illustrative embodiment the data processing device 14 determines the x, y, and z angles for the following body segments: (i) the right forearm, using the right elbow keypoint and the right wrist keypoint, (ii) the left forearm, using the left elbow keypoint and the left wrist keypoint, (iii) the right upper arm, using the right shoulder keypoint and the right elbow keypoint, (iv) the left upper arm, using the left shoulder keypoint and the left elbow keypoint, (v) the right thigh, using the right hip keypoint and the right knee keypoint, (vi) the left thigh, using the left hip keypoint and the left knee keypoint, (vii) the right shank, using the right knee keypoint and the right ankle keypoint, (viii) the left shank, using the left knee keypoint and the left ankle keypoint, (ix) the right foot, using the right ankle keypoint and the right toe keypoint, (x) the left foot, using the left ankle keypoint and the left toe keypoint, (xi) the pelvis, using the right hip keypoint and the left hip keypoint, (xii) the upper torso, using the right shoulder keypoint and the left shoulder keypoint, (xiii) right pelvis, using the sacrum keypoint and right hip keypoint, (xiv) left pelvis, using the sacrum keypoint and left hip keypoint, (xv) right upper trunk, using the C7 keypoint and right shoulder keypoint, (xvi) left upper trunk, using the C7 keypoint and left shoulder keypoint, (xvii) neck, using the C7 keypoint and head keypoint, (xviii) trunk, using the C7 keypoint and sacrum keypoint, (xix) right trunk, using the C7 keypoint and right hip keypoint, and (xx) left trunk, using the C7 keypoint and left hip keypoint.

In the illustrative embodiment, the data processing device 14 determines the limb segment angles for body segments in all three directions using the following equations:

$$\theta_{43} = \arctan\frac{y_3 - y_4}{x_3 - x_4} \qquad (18)$$

Equation (18) may be more generally written as:

$$\theta_{ij} = \arctan\frac{y_j - y_i}{x_j - x_i} \quad (19)$$

In equation (19) above, the x, y variables represent the x, y coordinates of the two ("i" and "j") keypoints that surround the segment (keypoints that are used to determine each segment angle in the list above). This can be changed to (y, z) or (x, z) to get all three directions of segment angles.

In the calculations performed above by the data processing device 14, the use of the arctan function can cause some difficulties because arctan only ranges from −90 to 90, and if the keypoints cross over each other (change angle "quadrants") the plots will sometimes jump by a value of 360 degrees. For example, instead of an angle going from 180 to 181, it goes from 180 to −179. To avoid this, the algorithms detect which angle quadrant the keypoints in consideration are oriented in, and will add either ±180, ±360, ±540, or ±720 in order to avoid the jumps. This results in the angles being continuous for two revolutions around a "circle". This is a small limitation; however, it is needed to avoid the 90 or 180 degrees "jumps" in the plots. For example, in the illustrative embodiment, the data processing device 14 executes the following lines of code in order to determine the limb segment angles:

```
for (int i = 1; i < Length; i++)
{
if ((pointOne(x/y/z)[i] (<=/>=) pointTwo (x/y/z)[i]) &&
(pointOne(x/y/z)[i] (<=/>=) pointTwo(x/y/z)[i]))
{
if ((pointOne (x/y/z)[i − 1] (<=/>=) pointTwo(x/y/z)[i − 1]) &&
(pointOne (x/y/z)[i − 1] (<=/>=) pointTwo (x/y/z)[i − 1]))
{
if (angles(x/y/z)[i − 1] (<=/>=) 0 && angles(x/y/z)[i − 1] (<=/>=) −
359)
{
angles(x/y/z)[i] = (± 180, 360, 540, 720) + (180 /
(float)System.Math.PI) * (float)System.Math.Atan((pointOne(x/y/z)[i] −
pointTwo(x/y/z)[i]) / (pointOne(x/y/z)[i] − pointTwo(x/y/z)[i]));
}
            else if (angles(x/y/z)[i − 1] (<=/>=) −359)
            {
angles(x/y/z)[i] = (± 180, 360, 540, 720) + (180 /
(float)System.Math.PI) * (float)System.Math.Atan((pointOne(x/y/z)[i] −
pointTwo(x/y/z)[i]) / (pointOne(x/y/z)[i] − pointTwo(x/y/z)[i]));
}
            else
            {
angles(x/y/z)[i] = (± 180, 360, 540, 720) + (180 /
(float)System.Math.PI) * (float)System.Math.Atan((pointOne(x/y/z)[i] −
pointTwo(x/y/z)[i]) / (pointOne(x/y/z)[i] − pointTwo(x/y/z)[i]));
}
}
}
```

Figure 29:
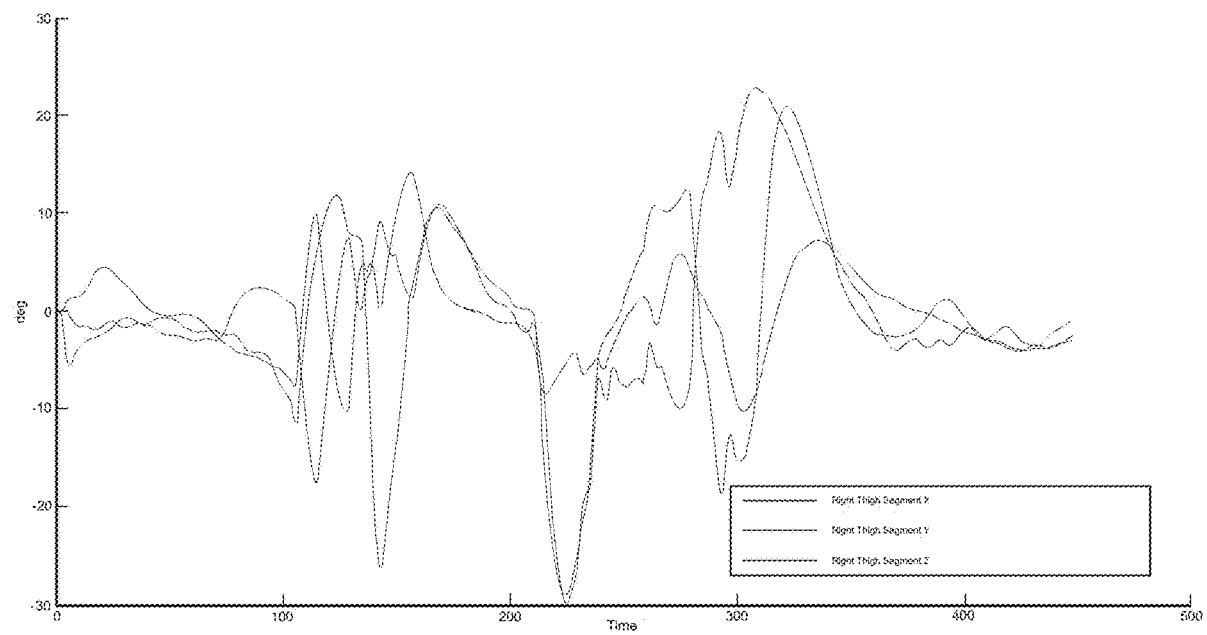
FIG. 29 is a graph illustrating body segment angles for a right thigh of a user over a period of time, according to an embodiment of the invention.

In the above lines of code, the keypoints are the input and the limb segment angle is the output. For example, for the computation of the right or left forearm angle, the inputs are the right or left elbow keypoint and the right or left wrist keypoint. The limb segment angles describe how a particular body segment is oriented. An exemplary output of the data processing device 14 for the right thigh segment angles (i.e., the angles in the x, y, z directions for the right thigh) in degrees over a period of time is depicted in FIG. 29.

Further, in the illustrative embodiment, the data processing device 14 determines the global joint angles of each body joint in the x, y, and z planes. More specifically, in the illustrative embodiment, the data processing device 14 determines the following joint angles in all three directions (x, y, z): (i) right knee, (ii) left knee, (iii) right elbow, (iv) left elbow, (v) right shoulder, (vi) left shoulder, (vii) right hip, (viii) left hip, (ix) right shoulder rotation, (x) left shoulder rotation, (xi) right hip rotation, and (xii) left hip rotation. The first eight listed joint angles (i.e., right knee, left knee, right elbow, left elbow, right shoulder, left shoulder, right hip, and left hip) are calculated by the data processing device 14 as described hereinafter. In general, each of the body joints has a convention for describing its magnitude and polarity. For example, when the knee of a person is fully extended, the knee angle is described as 0° flexion, and when the leg moves in a posterior direction relative to the thigh, the knee is said to be in flexion. In terms of absolute angles, the knee angle may be calculated as follows by the data processing device 14:

$$\text{knee angle} = \theta_k = \theta_{21} - \theta_{43} \quad (20)$$

In the above equation (20), if $\theta_{21} > \theta_{43}$, the knee is flexed; if $\theta_{21} < \theta_{43}$, the knee is extended. For the ankle joint, the convention is slightly different in that 90° between the leg and the foot is the boundary between plantarflexion and dorsiflexion. As such, the ankle angle may be calculated as follows by the data processing device 14:

$$\text{ankle angle} = \theta_a = \theta_{43} - \theta_{65} + 90° \quad (21)$$

In the above equation (21), if $\theta_a$ is positive, the foot is plantarflexed; if $\theta_a$ is negative, the foot is dorsiflexed. These two examples are described for the knee and ankle angles, but the method can be applied to any joint where the limb-segment angles are available around the joint. In equations (20) and (21) above, angle 21 is the thigh segment angle, angle 43 is the shank segment angle, and angle 65 is the foot segment angle. For shoulder abduction, the upper arm and trunk segment angles could be calculated in similar manner to the knee and ankle angles.

The other four joint angles listed above (i.e., right shoulder rotation, left shoulder rotation, right hip rotation, left hip rotation) are calculated by the data processing device 14 in different ways as only two keypoints are available to find the rotation of these joints. For shoulder external rotation, a 0° degree angle may correspond to the arm of the person pointing straight forward, a 90° degree angle may correspond to the arm of the person pointing straight up, and a 180° degree angle may correspond to the arm of the person pointing straight backward. The right and left shoulder rotation angles may be calculated as follows by the data processing device 14:

$$a = RWrs_z - RElb_z \quad (22)$$

$$a = RWrs_y - RElb_y \quad (23)$$

$$\theta = \tan^{-1}\left(\frac{a}{b}\right) \quad (24)$$

Then, to output the angle in the orientation as described above, the data processing device 14 adds either 0, 180, or −180 to the value based on the orientation and quadrants of the keypoints in order to avoid "jumps" in the plots and to report the angles according to the desired output. For hip external rotation, the same tangent method is used with the ankle and knee keypoints to find the desired hip angle. Then, to output the angle in the orientation as described above, the data processing device 14 adds either 0, 90, or −90 to the value based on the orientation and quadrants of the keypoints in order to avoid "jumps" in the plots and to report the angles according to the desired output.

In the illustrative embodiment, a plurality of joint angles are then normalized/adjusted by the data processing device 14. For example, in the illustrative embodiment, the following joint angles are normalized/adjusted: (i) shoulder abduction angle (shoulder joint angle Y), (ii) shoulder horizontal abduction angle (shoulder joint angle Z), (iii) hip flexion angle (hip joint angle X), and (iv) elbow flexion angle. For the determination of the shoulder abduction angle in the y-direction, the neutral position is when the arm of the person is extending straight down, while the 90 degree position of the arm is when the arm is extending outwardly from the side of the person in a horizontal direction. In order to obtain the shoulder abduction angle in the desired form, the data processing device 14 utilizes the following equations:

Left Shoulder Abduction=Left Shoulder Joint Angle Y-90 (25)

Right Shoulder Abduction=90-Right Shoulder Joint Angle Y (26)

For the determination of the shoulder abduction angle in the z-direction, the 90 degree horizontal flexion position is when the arm of the person extends straight out from the person in an anterior direction, the 0 degree horizontal flexion position is when the arm of the person extends straight out from the person in a lateral direction, and 90 degree horizontal extension position is when the arm of the person extends straight out from the person in a posterior direction. In order to obtain the shoulder horizontal abduction angle in the desired form, the data processing device 14 utilizes the following equations:

Left Shoulder Horizontal Abduction=Left Shoulder Joint Angle Y-180 (27)

Right Shoulder Horizontal Abduction=-1*Right Shoulder Joint Angle Y (28)

For the determination of the hip flexion angle (hip joint angle X), the 0 degree flexion position is when the leg of the person extends straight out from the person in an inferior direction, and the 90 degree flexion position is when the leg of the person extends outwardly from the person in an anterior direction (i.e., the leg is bent 90 degrees). In order to obtain the hip flexion angle in the desired form, the data processing device 14 utilizes the following equations:

Left Hip Flexion=180-Left Hip Joint Angle X (29)

Right Hip Flexion=180-Right Hip Joint Angle X (30)

For the determination of the elbow flexion angle, the 0 degree flexion position is when the forearm of the person extends straight out from the upper arm of the person, the 90 degree flexion position is when the forearm of the person forms a 90 degree angle with the upper arm of the person, and the 180 degree flexion position is when the forearm of the person is bent back against the upper arm of the person so that the forearm and upper arm are generally parallel to one another. In order to obtain the elbow flexion angle in the desired form, the data processing device 14 utilizes the following equations:

Left Elbow Flexion=Left Elbow Joint Angle Y (no normalization) (31)

Right Elbow Flexion=-1*Right Elbow Joint Angle Y (32)

In the illustrative embodiment, once these joint and segment angles have been calculated by the data processing device 14, and there is a value at each time point for each angle, the derivative of the angle time series data can be calculated to find both body joint angular velocities and body segment angular velocities. For example, the data processing device 14 may use the following equation on both the body joint angle data and body segment angle data to then find body joint angular velocities and body segment angular velocities in all three directions (x, y, z) for each angle at time point "i":

$$\omega_i = \frac{\theta_{i+1} - \theta_{i-1}}{2\Delta t} \text{ rad/s} \tag{33}$$

In the illustrative embodiment, similar to the body joint and segment angular velocities, the body joint and segment angular accelerations may be calculated at each time point by finding the derivative of the body joint and segment angular velocity. An equation similar to equation (33) may be used for angular acceleration, except that the angles will be replaced with velocities such that the derivative of angular velocity is now being taken:

$$Ax_i = \frac{Vx_{i+1} - Vx_{i-1}}{2\Delta t} \text{ m/s}^2 \tag{34}$$

In the illustrative embodiment, the data processing device 14 further determines the moment around the center of mass (COM) in the x, y, z planes using the coordinates of the center of mass and the forces in all three planes. Torque calculation laws are applied to these calculations about the point of the center of mass which is calculated using body segment percentages and body segment sum of torques.

The moments around the center of mass (COM) are calculated using equations (35)-(37) below in the illustrative embodiment. If the front plate COM moment is being determined, these values are all front plate values; if the rear plate COM moment is being determined, then these values are all rear plate values; and if the total/single plate COM moment is being determined, then these values are generated from aggregate/single plate data. In order to obtain the moments around the center of mass (COM), the data processing device 14 utilizes the following equations:

$$Mx = (Fy*COMz) + (Fz*(COPy - COMy)) + Mx \tag{35}$$

$$My = (Fx*COMz) + (Fz*(COPx - COMx)) + My \tag{36}$$

$$Mz = (Fz*(COPy - COMy)) + (Fy*(COPx - COMx)) + Mz \tag{37}$$

The total moment around the COM, also called the golfer ground interaction, is calculated by the data processing device 14 using the following equation:

$$M = \Sigma_i(\vec{r}_i \times \vec{F}_i \times \vec{\tau}_i) \tag{38}$$

In yet a further illustrative embodiment, other kinetic metrics are used to assess the baseball swing or the golf swing. These metrics include: (i) weighting-impact time and landing-impact time, (ii) "front-foot" versus "reverse" style of golf swing, (iii) weight transfer range, (iv) rate of weight transfer, and (v) single foot metrics. Each of these additional metrics will be explained hereinafter.

Figure 1:
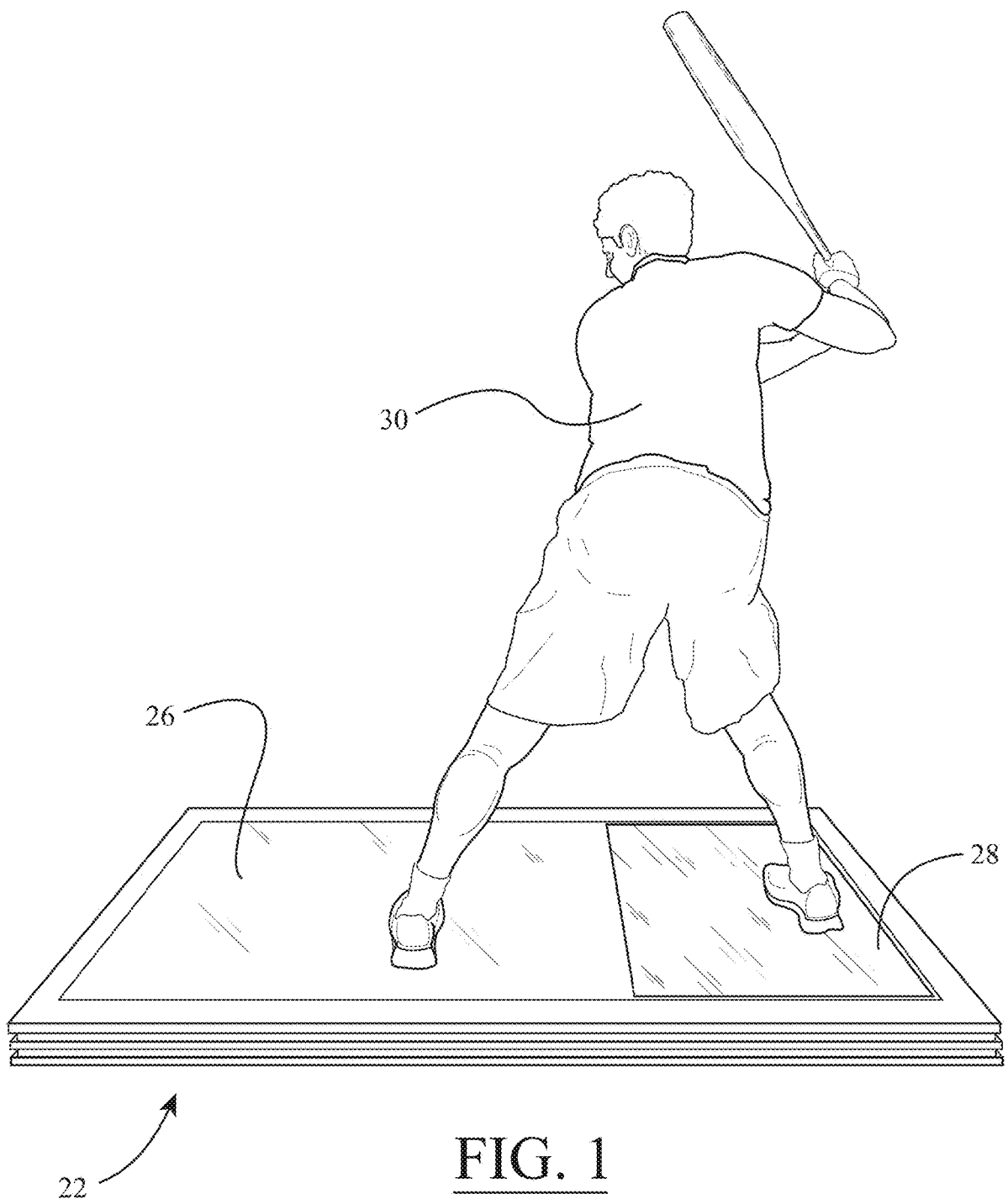
FIG. 1 is a perspective view of a baseball player disposed on a force measurement assembly of a swing analysis system, according to an illustrative embodiment of the invention.

First of all, weighting-impact time and landing-impact time are metrics that are used in conjunction with a dual force plate system, such as the dual plate system illustrated in FIG. 1. Weighting impact is the time between the weight being shifted to the front foot (i.e., front force $F_z$ reaching 50% BW) and impact. Landing impact is the time between the front foot returning to the front plate and impact. Both of these metrics are means to quantify the batter's timing mechanisms and give insight into whether the batter was fooled by a pitch and where the batter is making up for it. There are negative relationships between the time of weighting and landing with weighting-impact and landing-impact, respectively. In other words, the later the batter waits to get his or her front foot on the ground (landing) or shift his weight to the front foot (weighting), the faster he or she was to impact to make up for this delay.

Secondly, similar to the weighting-impact time and landing-impact time, the "front-foot" versus "reverse" style of golf swing are metrics that are used in conjunction with a dual force plate system, such as the dual plate system illustrated in FIG. 1. To determine the "front-foot" versus "reverse" style of golf swing, the CPx % is tracked from early downswing until ball contact. The CPx % is the total center of pressure percentage in the direction of the swing relative to the feet. The CPx % parameter describes the swing style as either front foot or reverse style of golf swing. Front foot styled swings have the CPx % increase between early downswing and ball contact. Reverse styled swings have the CPx % decrease between early downswing and ball contact.

Thirdly, the weight transfer range is a golf metric that may be used in conjunction with a dual force plate system, such as the dual plate system illustrated in FIG. 1, or a single force plate system. To determine the weight transfer range, the displacement of the x-coordinate of the center of pressure (COPx) is analyzed during the golf swing of the person. A larger weight transfer range is correlated with golf club head speed.

Fourthly, similar to the weight transfer range, the rate of weight transfer is a golf metric that may be used in conjunction with a dual force plate system, such as the dual plate system illustrated in FIG. 1, or a single force plate system. To determine the rate of weight transfer, the x-coordinate center of pressure (COPx) velocity is analyzed during the golf swing of the person. Like the weight transfer range, the rate of weight transfer also is correlated with golf club head speed.

Finally, there are other single foot metrics that may be used in conjunction with a dual force plate system, such as the dual plate system illustrated in FIG. 1. These single foot metrics include the time of rear foot peak (e.g., using the ground reaction force in the x, y, z directions (GRFx,y,z)) and time of front foot peak (e.g., using the ground reaction force in the x, y, z directions (GRFx,y,z)). There is a significant relationship between time of front foot peak GRFx and exit velocity. The closer to ball contact that this peak GRFx occurs, the higher the exit velocity of the baseball. These single foot metrics further include the value of the rear foot peak (e.g., using the ground reaction force in the x, y, z directions (GRFx,y,z)). There is a significant relationship between the peak rear GRFy and the exit velocity of the baseball. The decreased peak rear GRFz and the exit velocity also has a relationship, but, in actuality, this is not a significant groupwise relationship. Additionally, there is a significant relationship between the peak rear GRFz and the exit velocity (i.e., relationship between decreased peak rear GRFz and exit velocity). These single foot metrics also include the value of the front foot peak (e.g., using the ground reaction force in the x, y, z directions (GRFx,y,z)). There is a significant relationship between the peak front GRFy and the exit velocity (i.e., relationship between decreased peak front GRFz and exit velocity), but, in actuality, this is not a significant groupwise relationship.

In yet a further illustrative embodiment, the data processing device 14 of the swing analysis system 100 may be further configured to characterize a swing quality of the user by utilizing the one or more swing performance parameters and one or more trained neural networks (e.g., by using the trained neural networks described in U.S. Pat. No. 10,853,970). For example, the data processing device 14 may characterize the swing of the user as a good swing if the one or more swing performance parameters of the user fall within a predetermined acceptable range. Conversely, the data processing device 14 may characterize the swing of the user as a bad swing if the one or more swing performance parameters of the user fall outside a predetermined acceptable range. Also, after the swing analysis system 100 collects data for a sufficient quantity of swings, the data processing device 14 then is able to characterize the swing as good or bad based on a machine learning comparison to the other swings that have been evaluated and characterized. Also, the data processing device 14 may be further configured to make recommendations on how to improve a bad swing based on previously acquired swing data. In addition to characterizing the swing of the user, the data processing device 14 may further be configured to characterize a quality of other activities of the user as well.

It is readily apparent that the swing analysis system 100 described above offers numerous advantages and benefits for training athletes. First, the swing analysis system 100 is capable of determining swing performance metrics from output data of a force measurement assembly. Moreover, the swing analysis system 100 is capable of autodetecting one or more swing phases of a user. Furthermore, the swing analysis system 100 is capable of generating a swing analysis report that includes one or more swing performance metrics.

While reference is made throughout this disclosure to, for example, "an illustrative embodiment", "one embodiment", or a "further embodiment", it is to be understood that some or all aspects of these various embodiments may be combined with one another as part of an overall embodiment of the invention. That is, any of the features or attributes of the aforedescribed embodiments may be used in combination with any of the other features and attributes of the aforedescribed embodiments as desired.

Although the invention has been shown and described with respect to a certain embodiment or embodiments, it is apparent that this invention can be embodied in many different forms and that many other modifications and variations are possible without departing from the spirit and scope of this invention. For example, while the embodiments presented above focus on the analysis of a baseball swing, it is to be understood that the swing analysis principles described above may be applied to the swing analysis of any implement or object swung by a user, such as a baseball bat, cricket bat, golf club, tennis racket, squash racket, etc.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A swing analysis system, comprising:
a motion capture system comprising at least one motion capture device configured to detect the motion of one or more body segments of a user and generate output data;
a force measurement assembly configured to receive the user, the force measurement assembly including:
a top surface for receiving the body of the user; and
at least one force transducer, the at least one force transducer configured to sense one or more measured quantities and output one or more signals that are representative of forces and/or moments being applied to the top surface of the force measurement assembly by the user; and
at least one data processing device operatively coupled to the motion capture system and the force measurement assembly, the at least one data processing device configured to determine positional information for the one or more body segments of the user from the output data of the at least one motion capture device, the at least one data processing device further configured to receive the one or more signals that are representative of the forces and/or moments being applied to the top surface of the force measurement assembly by the user, and to convert the one or more signals into output forces and/or moments, and the at least one data processing device additionally configured to determine one or more swing performance parameters for the user using (i) the positional information of the one or more body segments of the user from the at least one motion capture device, the positional information of the one or more body segments of the user comprising keypoints for the one or more body segments of the user generated using a trained neural network, the trained neural network receiving image information from the output data of the at least one motion capture device as an input and outputting the keypoints for the one or more body segments of the user after processing the image information; and (ii) the output forces and/or moments from the force measurement assembly.

2. The swing analysis system according to claim 1, wherein the one or more swing performance parameters determined by the at least one data processing device comprise one or more center of mass locations for the one or more body segments of the user determined using the keypoints generated from the trained neural network.

3. The swing analysis system according to claim 2, wherein the one or more swing performance parameters determined by the at least one data processing device further comprise an overall body center of mass location for the body of the user determined using the one or more center of mass locations for the one or more body segments of the user.

4. The swing analysis system according to claim 3, wherein the output forces and/or moments determined by the at least one data processing device include first shear force ($F_x$) values, second shear force ($F_y$) values, and vertical force ($F_z$) values;
wherein the one or more swing performance parameters determined by the at least one data processing device further comprise a moment about the center of mass for the user; and
wherein the at least one data processing device determines the moment about the center of mass for the user as a function of the overall body center of mass location for the user and the first shear force values, the second shear force values, and the vertical force values.

5. The swing analysis system according to claim 4, wherein the at least one data processing device further determines the moment about the center of mass for the user as a function of a center of pressure for the user on the force measurement assembly.

6. The swing analysis system according to claim 1, wherein the one or more swing performance parameters determined by the at least one data processing device comprise one or more body segment angles for the one or more body segments of the user determined using the keypoints generated from the trained neural network.

7. The swing analysis system according to claim 6, wherein the one or more swing performance parameters determined by the at least one data processing device further comprise one or more body joint angles for the user determined using the one or more body segment angles for the one or more body segments of the user.

8. The swing analysis system according to claim 7, wherein the one or more swing performance parameters determined by the at least one data processing device further comprise one or more body joint angular velocities for the user determined using the one or more body joint angles of the user.

9. The swing analysis system according to claim 8, wherein the one or more swing performance parameters determined by the at least one data processing device further comprise one or more body joint angular accelerations for the user determined using the one or more body joint angular velocities of the user.

10. The swing analysis system according to claim 6, wherein the one or more swing performance parameters determined by the at least one data processing device further comprise one or more body segment angular velocities for the one or more body segments of the user determined using the one or more body segment angles for the one or more body segments of the user.

11. The swing analysis system according to claim 10, wherein the one or more swing performance parameters determined by the at least one data processing device further comprise one or more body segment angular accelerations for the one or more body segments of the user determined using the one or more body segment angular velocities for the one or more body segments of the user.

12. The swing analysis system according to claim 1, wherein the force measurement assembly is in the form of an instrumented treadmill, force plate, or a balance plate.

13. The swing analysis system according to claim 1, wherein the force measurement assembly comprises a front force plate and a rear force plate.

14. The swing analysis system according to claim 1, wherein the at least one data processing device is further configured to characterize a swing quality of the user by utilizing the one or more swing performance parameters and a trained neural network.

15. A swing analysis system, comprising:
a motion capture system comprising at least one motion capture device configured to detect the motion of one or more body segments of a user and generate output data;
a force measurement assembly configured to receive the user, the force measurement assembly including:
a top surface for receiving the body of the user; and
at least one force transducer, the at least one force transducer configured to sense one or more measured quantities and output one or more signals that are representative of forces and/or moments being applied to the top surface of the force measurement assembly by the user; and at least one data processing device operatively coupled to the motion capture system and the force measurement assembly, the at least one data processing device configured to determine positional information for the one or more body segments of the user from the output data of the at least one motion capture device, the at least one data processing device further configured to receive the one or more signals that are representative of the forces and/or moments being applied to the top surface of the force measurement assembly by the user, and to convert the one or more signals into output forces and/or moments, and the at least one data processing device additionally configured to determine one or more swing performance parameters for the user using at least one of: (i) the positional information of the one or more body segments of the user from the at least one motion capture device, the positional information of the one or more body segments of the user comprising keypoints for the one or more body segments of the user generated using a trained neural network; and (ii) the output forces and/or moments from the force measurement assembly;

wherein the one or more swing performance parameters determined by the at least one data processing device comprise one or more center of mass locations for the one or more body segments of the user determined using the keypoints generated from the trained neural network;

wherein the one or more swing performance parameters determined by the at least one data processing device further comprise an overall body center of mass location for the body of the user determined using the one or more center of mass locations for the one or more body segments of the user;

wherein the output forces and/or moments determined by the at least one data processing device include first shear force ($F_x$) values, second shear force ($F_y$) values, and vertical force ($F_z$) values;

wherein the one or more swing performance parameters determined by the at least one data processing device further comprise a moment about the center of mass for the user; and wherein the at least one data processing device determines the moment about the center of mass for the user as a function of the overall body center of mass location for the user and the first shear force values, the second shear force values, and the vertical force values.

16. The swing analysis system according to claim 15, wherein the at least one data processing device further determines the moment about the center of mass for the user as a function of a center of pressure for the user on the force measurement assembly.

17. The swing analysis system according to claim 15, wherein the force measurement assembly is in the form of an instrumented treadmill, force plate, or a balance plate.

18. The swing analysis system according to claim 15, wherein the force measurement assembly comprises a front force plate and a rear force plate.

* * * * *